US011051166B1

(12) United States Patent
Buliga et al.

(10) Patent No.: US 11,051,166 B1
(45) Date of Patent: Jun. 29, 2021

(54) CONTROLLING ACCESS TO A COMPUTING DEVICE WITH A WIRELESS DEVICE USING WIRELESS SIGNAL STRENGTH MEASUREMENTS

(71) Applicant: BullGuard Ltd., London (GB)

(72) Inventors: Vlad Mihai Buliga, Comarnic (RO); Alexandru Cosmin Vlajoaga, Bucharest (RO); Raluca Iulia Stanciu, Ploiesti (RO); Robert A. Clyde, Pleasant Grove, UT (US)

(73) Assignee: NortonLifeLock Inc., Tempe, AZ (US)

( * ) Notice: Subject to any disclaimer, the term of this patent is extended or adjusted under 35 U.S.C. 154(b) by 33 days.

(21) Appl. No.: 16/393,092

(22) Filed: Apr. 24, 2019

Related U.S. Application Data

(60) Provisional application No. 62/662,947, filed on Apr. 26, 2018.

(51) Int. Cl.
*H04L 29/06* (2006.01)
*H04W 12/06* (2021.01)
*H04B 17/318* (2015.01)
*H04W 60/00* (2009.01)
*H04L 29/08* (2006.01)
*H04W 12/0431* (2021.01)

(52) U.S. Cl.
CPC .......... *H04W 12/06* (2013.01); *H04B 17/318* (2015.01); *H04L 67/26* (2013.01); *H04W 12/0431* (2021.01); *H04W 60/00* (2013.01); *H04L 67/12* (2013.01)

(58) Field of Classification Search
CPC ............ H04W 12/06; H04W 12/04031; H04W 60/00; H04B 17/318; H04L 67/26; H04L 67/12
See application file for complete search history.

(56) References Cited

U.S. PATENT DOCUMENTS 8,295,834 B2 * 10/2012 Coppinger ............. G06Q 20/40
                                                        455/435.1
9,730,049 B1 * 8/2017 Malik ...................... H04W 4/80
10,117,065 B1 * 10/2018 De Lorenzo ........... H04B 17/21
(Continued)

OTHER PUBLICATIONS

Non-Final Office Action dated Oct. 6, 2020, for U.S. Appl. No. 16/393,085, filed Apr. 24, 2019, 16 total pages.

*Primary Examiner* — Ghodrat Jamshidi
(74) *Attorney, Agent, or Firm* — Maschoff Brennan

(57) ABSTRACT

A method for controlling access to a computing device which involves detecting, at a key device, one or more wireless devices configured as wireless access points. A handshake operation involving the key device and the computing device is performed wherein the computing device is included among the one or more wireless devices. Wireless signals transmitted by the computing device are received, during a calibration phase, at the key device. During the calibration phase the key device determines an approximate signal strength corresponding to a desired distance between the key device and the computing device. Based upon a received signal strength of other wireless signals transmitted by the computing device, it may be detected that the key device and the computing device are separated by at least the desired distance. If so, the computing device may be electronically locked or user access to it otherwise inhibited.

6 Claims, 18 Drawing Sheets

(56) References Cited

U.S. PATENT DOCUMENTS

| | | | |
|---|---|---|---|
| 10,231,128 B1 | 3/2019 | Ziraknejad et al. | |
| 10,631,165 B1 | 4/2020 | Goyal et al. | |
| 2004/0218602 A1* | 11/2004 | Hrastar | H04L 67/125 370/390 |
| 2013/0029630 A1* | 1/2013 | Salkini | H04L 63/102 455/404.1 |
| 2013/0301429 A1* | 11/2013 | Peters | H04L 45/18 370/252 |
| 2014/0357211 A1* | 12/2014 | May | H03G 3/3036 455/234.2 |
| 2015/0074266 A1* | 3/2015 | Alisawi | H04L 67/26 709/224 |
| 2015/0139010 A1 | 5/2015 | Jeong et al. | |
| 2015/0256973 A1* | 9/2015 | Raounak | H04L 67/22 726/7 |
| 2016/0315922 A1 | 10/2016 | Chew et al. | |
| 2017/0221328 A1* | 8/2017 | Wang | H04B 17/318 |
| 2018/0376280 A1* | 12/2018 | N sje | H04L 67/18 |
| 2019/0023528 A1* | 1/2019 | Franco | H04W 4/33 |

\* cited by examiner

CONTROLLING ACCESS TO A COMPUTING DEVICE WITH A WIRELESS DEVICE USING WIRELESS SIGNAL STRENGTH MEASUREMENTS

CROSS-REFERENCE TO RELATED APPLICATIONS

This application claims priority to and the benefit of U.S. Provisional Patent Application No. 62/662,947, entitled CONTROLLING ACCESS TO A COMPUTING DEVICE WITH A WIRELESS DEVICE USING WIRELESS SIGNAL STRENGTH MEASUREMENTS, filed on Apr. 26, 2018, the disclosure of which is incorporated herein by reference in its entirety for all purposes.

This application is generally related to improving the security of computing devices with respect to attempts for unauthorized access by persons within the vicinity of such devices and, more particularly, to systems and methods for using wireless devices to selectively control such access.

BACKGROUND

Computing devices such as laptop computers may be locked or secured in several ways when not being actively used. For example, a "lock" screen may be invoked by a user through the user interface of the computer. In addition, commercial applications enable mobile devices (e.g., smartphones) to be used to lock personal computing devices such as laptop computers. Such locking applications generally operate to detect the presence or absence of Bluetooth signals from a user's mobile device. When the locking application on the laptop fails to detect such a Bluetooth signal, the application locks the computing device. Other applications using mobile devices as smart locks rely upon the geolocation of the mobile device to determine when the computing device should be locked.

There are several problems with such locking applications. First, the requirement that the mobile device continuously transmit a Bluetooth signal poses security risks and drains the device's battery. Second, Bluetooth signals are not always reliable (i.e., paired devices can disconnect while in range). As a result, the locking application is inappropriately activated and causes unnecessary locks of the computing device, which can be annoying to users.

The Dynamic Lock feature present within Windows 10 provides a specific example of an available locking application. It uses Bluetooth as a means of detecting if a mobile device is in range a computer running the Windows 10 operating system. Specifically, Dynamic Lock detects if a previously-paired mobile device is visible or not. Although useful, such a system does not enable a user to set or otherwise configured a threshold separation distance between the mobile device and the computer at which locking will occur. Moreover, given that paired Bluetooth signals may remain connected at up to 10 meters, a user in possession of a mobile may move a substantial distance from the user's computer before locking of the computer occurs. In addition, it may take a minute or longer for locking applications such as Dynamic Lock to automatically lock the computer upon which they are executing once a mobile device has moved out of range. This relatively large time lag in detection poses a security risk.

Existing locking applications such as, for example, Dynamic Lock, are believed to lack an unlock capability. That is, a user returning to a computer that has been automatically locked is required to manually unlock the computer via its user interface. Moreover, existing locking applications may not adequately address the need of certain users to protect or otherwise keep the contents of personal or important files, such as, for example, documents, personal photos or videos, safe from unauthorized access.

SUMMARY

Embodiments of the disclosed access control system automatically lock a computer when a mobile device known to the computer is out of range and automatically unlock the computer when that mobile device comes in range. The range is a threshold distance which is typically previously set by the user. The mobile device is a device which the user has previously selected as the locking/unlocking "key". In one implementation the strength of the wireless signal, such as a Wi-Fi signal, emitted by either the mobile device or the computer is periodically measured and evaluated in order to determine whether the wireless device is within a predefined range of the computer. In one embodiment this may be done by effectively translating the signal strength measurement into a corresponding distance and comparing this distance to the predefined range. The computer may be automatically locked when it is determined that the determined distance exceeds this predefined range and automatically unlocked when the wireless signal strength measurements indicate that the device has returned to within the predefined range.

The disclosed computer access control system and method can help improve the privacy protection of computers by automating its locking process when a user is no longer in the vicinity of the user's computer, as determined by the proximity of the user's mobile device (e.g., smartphone) to the user's computer. An access control application executing on, for example, the user's computer can automatically unlock the user's computer once the user's mobile phone is again within a predefined range of the computer. As an option, reauthentication may also be required for unlocking of the computer. In one embodiment the default lock/unlock feature offered by the computer's operating system may be invoked by the application in order to lock and unlock the user's computer when the user's mobile device is outside of, and returns to within, the predefined range. Alternatively, the application may invoke a dedicated lock/unlock feature separate from the lock/unlock functionality offered by the computer's operating system. This dedicated feature may be customized to, for example, cause all of the computer's ports (except the mouse port) to be disabled and a predetermined screensaver to be launched as part of the locking process.

The disclosed access control system is needed for improved computer security due to the fact that many users are oblivious to the high security risks which can emerge from leaving a computer both unlocked and unsupervised. Sensitive data can be stolen, malware can be installed, and e-mail, social media, or work accounts may be hacked during periods in which the system is left unlocked and unattended. Existing locking solutions which simply detect the presence of Bluetooth signals are often unreliable, generally exhibit a time lag before locking, do not permit a customized lock/unlock range to be set, and do not offer automatic unlocking.

In situations in which the unlock feature does not work for some reason (e.g., the Wi-Fi capability of the mobile device is turned off or stops working), fallback options may be provided. For example, either a PIN, face recognition, or fingerprint unlock may be used or the native unlock feature supported by the computer's operating system may be used.

For added security, the access control application could be configured to require that a fingerprint, face recognition or PIN be provided to reauthenticate the user to the smartphone before unlocking once it has been determined that the user's mobile device is within a predefined range of the computer. This could also be coupled with a time constraint so that as long as the user had reauthenticated within a specified time period, the unlock would be allowed to proceed without an additional reauthentication once it had been determined that the mobile device was within range.

The access control techniques described herein may be applied not only to protect a user's computer, but also to selectively permit access to only certain files or folders. For example, the application could be configured to permit a user to access sensitive files or folders only when the user's mobile device was within a predefined range of the user's computer and when the user had been authenticated through conventional means (e.g., via a username and password entered into a default "lock" screen of the computer).

In one particular aspect the disclosure relates to a method for controlling access to a computing device. The method includes detecting, at the computing device, one or more wireless devices configured as wireless access points. A handshake operation involving the computing device and a key device may then be performed. The key device may be included among the one or more wireless devices. The method further includes receiving, at the computing device and during a calibration phase, wireless signals transmitted by the key device wherein during the calibration phase the computing device determines an approximate signal strength corresponding to a desired distance between the computing device and the key device. Subsequent to the calibration phase, other wireless signals transmitted by the key device are received at the computing device. The method further includes detecting, based upon a received signal strength of the other wireless signals, that the computing device and the key device are separated by at least the desired distance and, in response, electronically locking or otherwise inhibiting user access to the computing device.

In another aspect the disclosure relates to a computing device configured for controlled access. The computing device includes a wireless transceiver, a processor, and a memory including program code. When executed by the processor, the program code causes the processor to detect, based upon wireless signal transmissions received by the wireless transceiver, one or more wireless devices configured as wireless access points. The program code further causes the processor to perform a handshake operation involving the computing device and a key device wherein the key device is included among the one or more wireless devices. The processor is further configured to determine, based upon wireless signals transmitted by the key device and received by the wireless transceiver during a calibration phase, an approximate signal strength corresponding to a desired distance between the computing device and the key device. The program code further causes the processor to detect, based upon a received signal strength of other wireless signals received by the wireless transceiver subsequent to the calibration phase, that the computing device and the key device are separated by at least the desired distance and electronically locking or otherwise inhibiting user access to the computing device.

The disclosure also pertains to a method for controlling access to a computing device. The method includes detecting, at the computing device, one or more wireless devices configured as wireless access points. The method further includes sending, from the computing device, a device registration request to a remote server wherein the device registration request forms at least part of a handshake operation involving the computing device and a key device included among the one or more wireless devices. During a calibration phase, wireless signals transmitted by the key device are received at the computing device. The computing device determines, based upon these wireless signals, an approximate signal strength corresponding to a desired distance between the computing device and the key device. Subsequent to the calibration phase, other wireless signals transmitted by the key device are received at the computing device. It may then be detected, based upon a received signal strength of the other wireless signals, that the computing device and the key device are separated by at least the desired distance. In response, the computing device may be electronically locked or access to the computing device may be otherwise inhibited.

The disclosure is also directed to a method for controlling access to a computing device which involves detecting, at the computing device, one or more wireless devices configured as wireless access points. The method further includes sending, from the computing device, a device registration request to a remote server wherein the device registration request forms at least part of a handshake operation involving the computing device and a key device. The key device is included among the one or more wireless devices. Wireless signals transmitted by the key device are then received at the computing device. Based upon a received signal strength of the wireless signals, it is determined whether the computing device and the key device are separated by at least the desired distance. If so, the computing device may be electronically locked or user access to the computing device otherwise inhibited.

In yet another aspect the disclosure relates to a method for controlling access to a computing device which involves detecting, at a key device, one or more wireless devices configured as wireless access points. The method further includes performing a handshake operation involving the key device and the computing device wherein the computing device is included among the one or more wireless devices. Wireless signals transmitted by the computing device are received, during a calibration phase, at the key device. During the calibration phase the key device determines an approximate signal strength corresponding to a desired distance between the key device and the computing device. The method further includes receiving, at the key device and subsequent to the calibration phase, other wireless signals transmitted by the computing device. Based upon a received signal strength of the other wireless signals, it may be detected that the key device and the computing device are separated by at least the desired distance. If so, the computing device may be electronically locked or user access to it otherwise inhibited.

The disclosure is further directed to a method for controlling access to a computing device which involves detecting, at a key device, one or more wireless devices configured as wireless access points. A device registration request is sent, from the key device, to a remote server wherein the device registration request forms at least part of a handshake operation involving the key device and the computing device wherein the computing device is included among the one or more wireless devices. At the key device and during a calibration phase, wireless signals transmitted by the computing device are received. During the calibration phase the key device determines an approximate signal strength corresponding to a desired distance between the key device and the computing device. The method further includes receiving, at the key device and subsequent to the calibration phase, other wireless signals transmitted by the computing device. The method further involves detecting, based upon a received signal strength of the other wireless signals, that the key device and the computing device are separated by at least the desired distance. In response, steps are taken to electronically lock or otherwise inhibit user access to the computing device.

The disclosure also describes a method for controlling access to a computing device which involves detecting, at a key device, one or more wireless devices configured as wireless access points. A device registration request message, is then sent from the key device, to a remote server. The device registration request forms at least part of a handshake operation involving the key device and the computing device where the computing device is included among the one or more wireless devices. Wireless signals transmitted by the computing device are then received. The method further includes detecting, based upon a received signal strength of the wireless signals, that the computing device and the key device are separated by at least the desired distance. In the event of such detection, access to the computing device may be electronically locked or user access otherwise inhibited.

The disclosure also pertains to a method for controlling access to contents of one or more folders stored within memory of a computing device. The method involves detecting, at a key device, one or more wireless devices configured as wireless access points. The method further includes performing a handshake operation involving the key device and the computing device wherein the computing device is included among the one or more wireless devices. Wireless signals transmitted by the computing device are received, during a calibration phase, at the key device. During the calibration phase the key device determines an approximate signal strength corresponding to a desired distance between the key device and the computing device. The method further includes receiving, at the key device and subsequent to the calibration phase, other wireless signals transmitted by the computing device. Based upon a received signal strength of the other wireless signals, it may be detected that the key device and the computing device are separated by at least the desired distance. If so, the computing device may electronically lock or otherwise inhibit user access to the contents of the one or more folders.

In a further aspect the disclosure is directed to a method for controlling access to contents of one or more folders stored within memory of a computing device. The method involves detecting, at a key device, one or more wireless devices configured as wireless access points. A device registration request is sent from the key device to a remote server. The device registration request forms at least part of a handshake operation involving the key device and the computing device, where the computing device is included among the one or more wireless devices. At the key device and during a calibration phase, wireless signals transmitted by the computing device are received. During the calibration phase the key device determines an approximate signal strength corresponding to a desired distance between the key device and the computing device. The method further includes receiving, at the key device and subsequent to the calibration phase, other wireless signals transmitted by the computing device. The method further involves detecting, based upon a received signal strength of the other wireless signals, that the key device and the computing device are separated by at least the desired distance. In response, steps are taken to electronically lock or otherwise inhibit user access to the contents of the one or more folders.

The disclosure is also directed to a method for controlling access to contents of one or more folders stored within memory of a computing device. The method involves detecting, at a key device, one or more wireless devices configured as wireless access points. A device registration request message is then sent from the key device to a remote server. The device registration request forms at least part of a handshake operation involving the key device and the computing device, where the computing device is included among the one or more wireless devices. Wireless signals transmitted by the computing device are then received. The method further includes detecting, based upon a received signal strength of the wireless signals, that the computing device and the key device are separated by at least the desired distance. In the event of such detection, user access to the contents of the one or more folders may be electronically locked or otherwise inhibited.

BRIEF DESCRIPTION OF THE DRAWINGS

For a better understanding of the nature and objects of various embodiments of the invention, reference should be made to the following detailed description taken in conjunction with the accompanying drawings, wherein.

DETAILED DESCRIPTION OF EMBODIMENTS

Figure 1A:
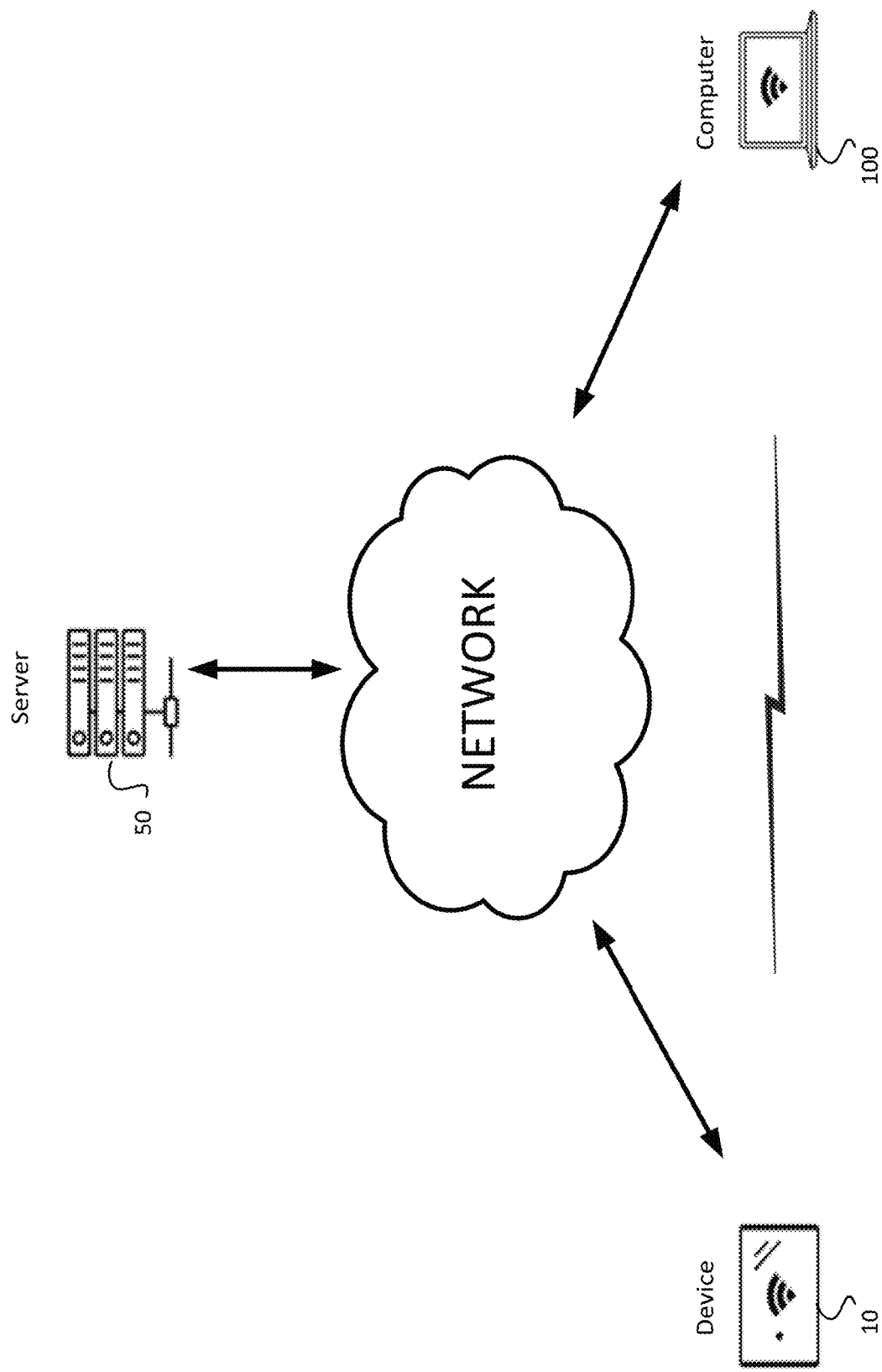
FIG. 1A illustrates elements of an exemplary system for controlling access to a computing device in accordance with the disclosure.

Various embodiments are described below with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Attention is now directed to FIG. 1A, which illustrates elements of an exemplary system for controlling access to a computing device in accordance with the disclosure. As shown, the system includes a user communication device 10, such as a smartphone, which may hereinafter also be referred to as a key device 10. As is discussed hereinafter, the key device 10 is used in controlling access to a computing device 100, such as a laptop, tablet or personal computer. For convenience, the computing device 100 may also be referred to hereinafter as the PC 100. Both the key device 10 and the PC 100 may be in communication with a server 50 through a network comprised of one or more wired or wireless networks.

The system of FIG. 1A may be implemented in at least two potential configurations, both of which are described below. In each configuration, the system operates in a handshake phase followed by signal strength reading phase. During the signal strength reading phase, a wireless signal is transmitted by one of the key device 10 and the PC 100 and received by the other of the key device 10 and PC 100. Once received, a strength of the wireless is measured or otherwise determined. It has been found that improved results may be achieved when the wireless signal comprises a Wi-Fi signal and where reading of the strength of the Wi-Fi signals corresponds to determining the corresponding RSSI. In a first configuration of the system, the key device 10 is configured to transmit a wireless signal (i.e., is configured as a "hotspot") and the PC 100 determines the RSSI of the wireless signal received from the key device. In a second system configuration the roles of the key device 10 and the PC 100 are reversed. That is, in the second configuration the PC 100 is configured as a wireless hotspot and the key device 10 reads the RSSI of the received wireless signal.

Figure 1B:
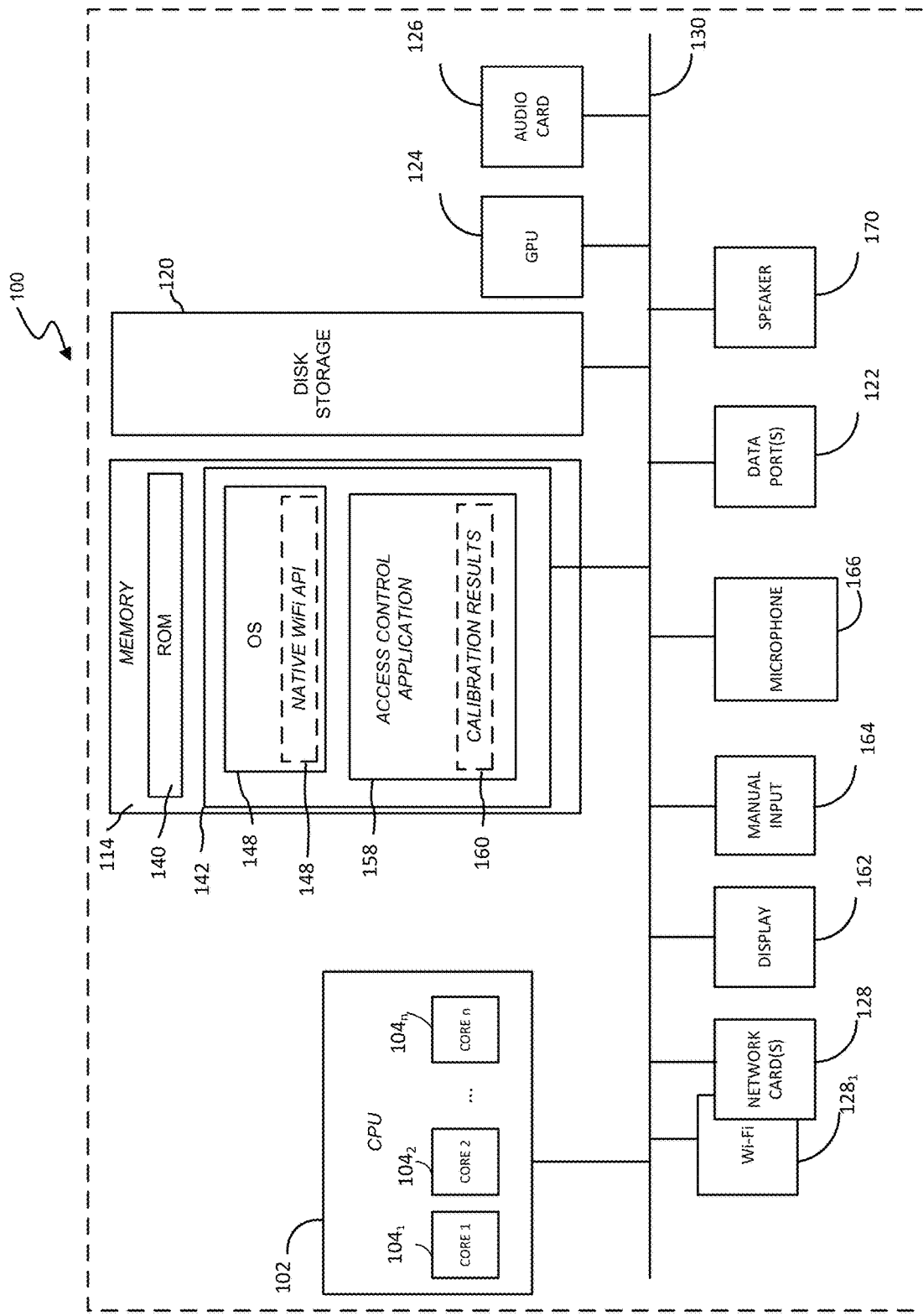
FIG. 1B is a block diagram illustrating the principal components of a computer system to which access may be controlled using wireless signal strength measurements is shown.

Referring now to FIG. 1B, a block diagram illustrating the principal components of a computer system 100 to which access may be controlled using wireless signal strength measurements is shown. Computer system 100 may be used to implement a desktop computer, a workstation, a laptop computer, or other type of data processing device. As shown, computer system 100 includes a central processing unit ("CPU") 102 which may optionally have a plurality of cores 104, system memory 114, disk storage 120, data port(s) 122, graphics processing unit (GPU) 124, audio card 126 and network card(s) 128 connected by system bus 130. System bus 130 may include a memory bus or memory controller, a peripheral bus, and a local bus, and may utilize any of a various known bus architectures. Network card(s) 128 may provide an Ethernet, Wi-Fi, GSM, Bluetooth or other wired, wireless, or cellular network interface for connecting computer system 100 to an external network, such as the Internet. In one embodiment one of the network card(s) comprises a Wi-Fi module 1281. Data port 122 may be any data port as is known in the art for interfacing with an external accessory using a data protocol such as RS-232, USB, or Firewire. Disk storage 120 may be a conventional read/write memory such as a magnetic disk drive, floppy disk drive, compact-disk read-only-memory (CD-ROM) drive, digital video disk (DVD) read or write drive, transistor-based memory or other computer-readable memory device as is known in the art for storing and retrieving data.

In one embodiment system memory 114 may include a read-only memory (ROM) 140 and random access memory (RAM) 142. The ROM 140 generally stores a basic input/output system (BIOS), which contains foundational routines to convey information between components of computer system 100. RAM 142 stores an operating system 148 (OS), such as, for example, Windows®, Linux or other type of OS. As shown, the operating system 148 may define a Native Wi-Fi API 148. In the case of the Windows® operating system, the Native Wi-Fi API 148 comprises the API "Native Wifi". System memory 114 also stores applications and programs currently executing as processes on the computer system 100. These programs may include, for example, an access control application 158 configured in the manner described herein. As is discussed below, during operation of the access control application 158 it may accumulate calibration results 160 useful for setting a threshold separation between the PC 100 and the key device 10 beyond which the PC 100 is electronically locked.

CPU 102 communicates with a plurality of peripheral equipment. Additional peripheral equipment may include a display 162, manual input device 164 and microphone 166. Display 162 may be a visual display such as a liquid crystal display (LCD) screen, touch-sensitive screen, or other monitors as are known in the art for visually displaying images and text to a user. Manual input device 164 may be a conventional keyboard, keypad, mouse, trackball, or other input device as is known in the art for the manual input of data. Microphone 166 may be any suitable microphone as is known in the art for providing audio signals to CPU 102. In addition, a speaker 170 may be attached for reproducing audio signals from CPU 102. It is understood that microphone 160 and speaker 170 may include appropriate digital-to-analog and analog-to-digital conversion circuitry as appropriate.

First System Configuration

Figure 2A:
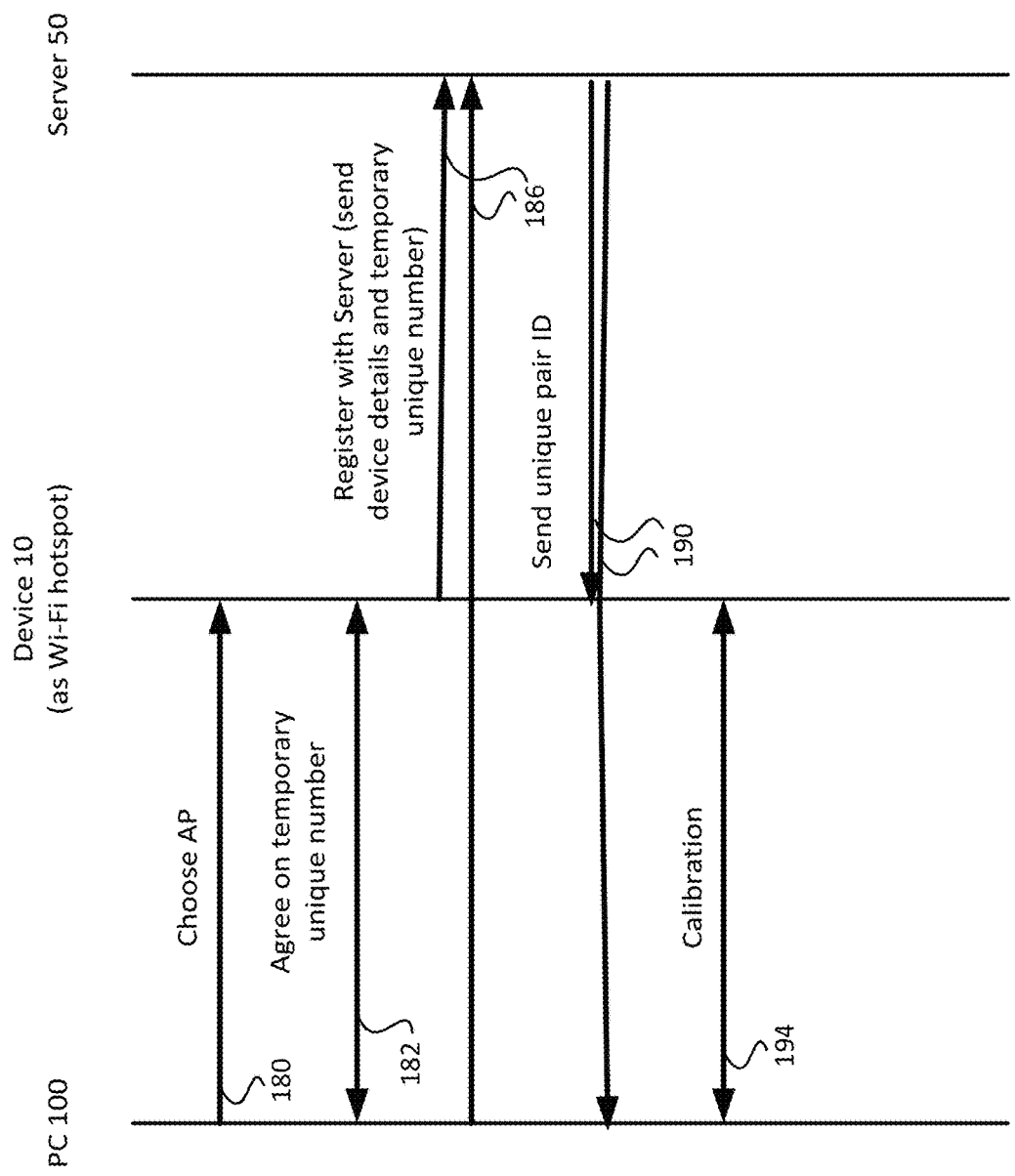
FIGS. 2A and 2B are flowcharts reflecting the manner in which a handshake phase is performed within a first system configuration.
Figure 2B:
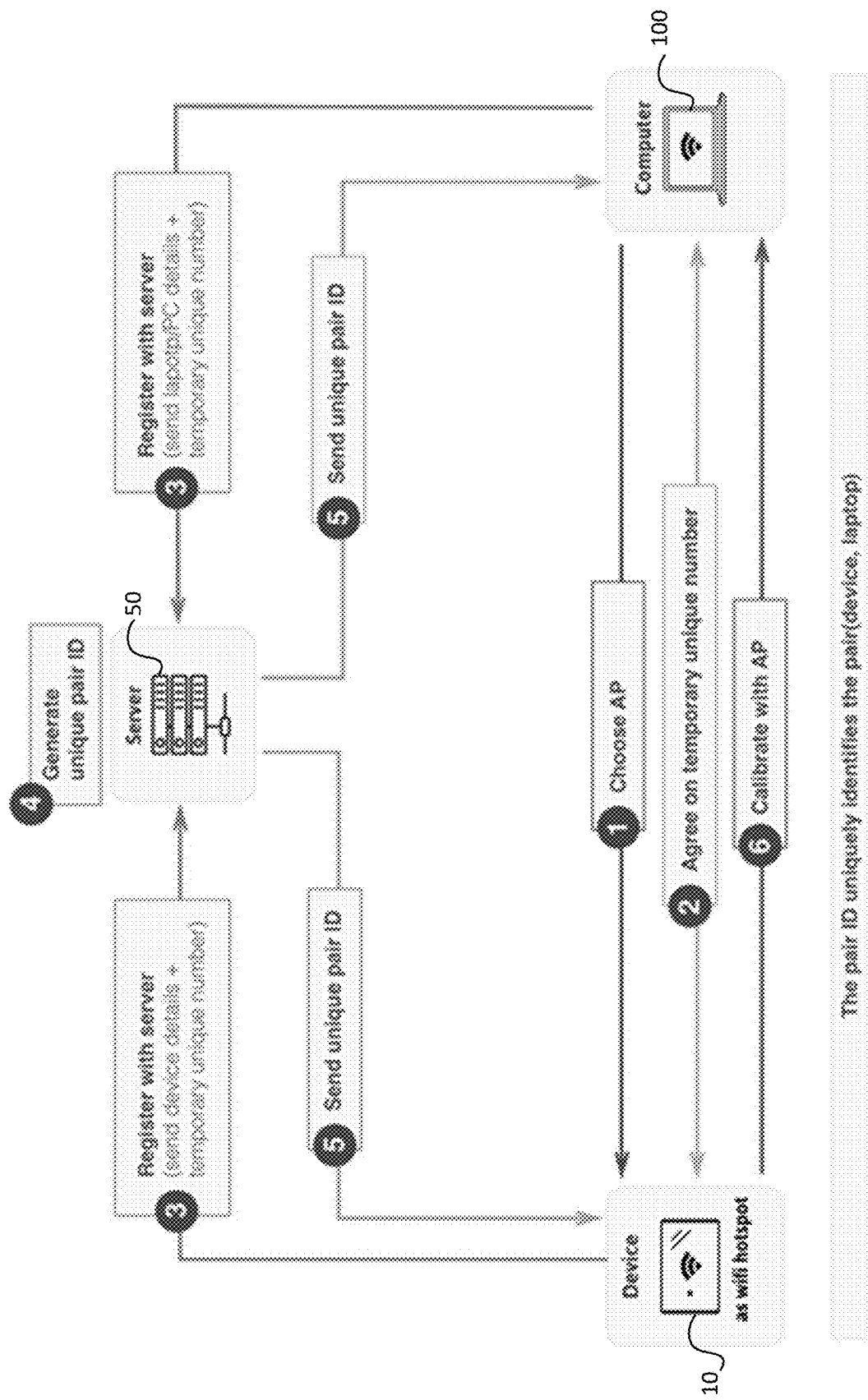

Attention is now directed to FIGS. 2A and 2B, which are flowcharts reflecting the manner in which a handshake phase is performed within the first system configuration. As shown, in one embodiment of the handshake phase the PC 100 detects all available Wi-Fi access points, one of which is selected by a user as the key device 10; that is, the user sets the key device 10 as a Wi-Fi hotspot. Once set as a hotspot, the key device 10 is detected and chosen by the PC 100 as the hotspot to which the PC 100 will connect (stage 180). At this stage, both the key device 10 and the PC 100 register with server 50. In order to enhance security, as an initial step in this registration process the key device 10 and the PC 100 communicate through Wi-Fi direct and exchange a temporary unique-number (stage 182). Afterwards, both the key device 10 and the PC 100 send a device registration request to the server 50 (stage 186). In one embodiment each device registration request includes details specific to the device 10 or the device 100 and the temporary unique number. Because of the temporary unique number, the server 50 is able to detect which device registration-request is paired with which PC registration-request. The server 50 concludes this registration process by generating a unique pair ID and communicating this unique pair ID back to the key device 10 and the PC 100 (stage 190). As is discussed below, in one embodiment this unique pair ID will be later used in a re-authentication scenario.

Once the registration has ended, a user of the key device 10 and PC 100 may now configure locking/unlocking parameters relevant to the control of access to the PC 100. These parameters may include, for example, the Windows login credentials for the PC 100, the threshold distance between the PC 100 and the key device 10 at which locking and/or unlocking will occur, and the allowed timeframe during which multiple unlocks can occur without requiring re-authentication. Because the translation between wireless signal strength and meters is hardware dependent, the user of the key device 10 and PC 100 causes the access control application 158 (FIG. 1B) executing on the PC 100 to perform a calibration operation (stage 194) with the key device 10. Through this calibration operation the access control application 158 will learn which approximate signal strength translates into the desired threshold distance to the key device 10 and will store this signal strength and potentially other information as calibration results 160 (FIG. 1B).

Figure 3:
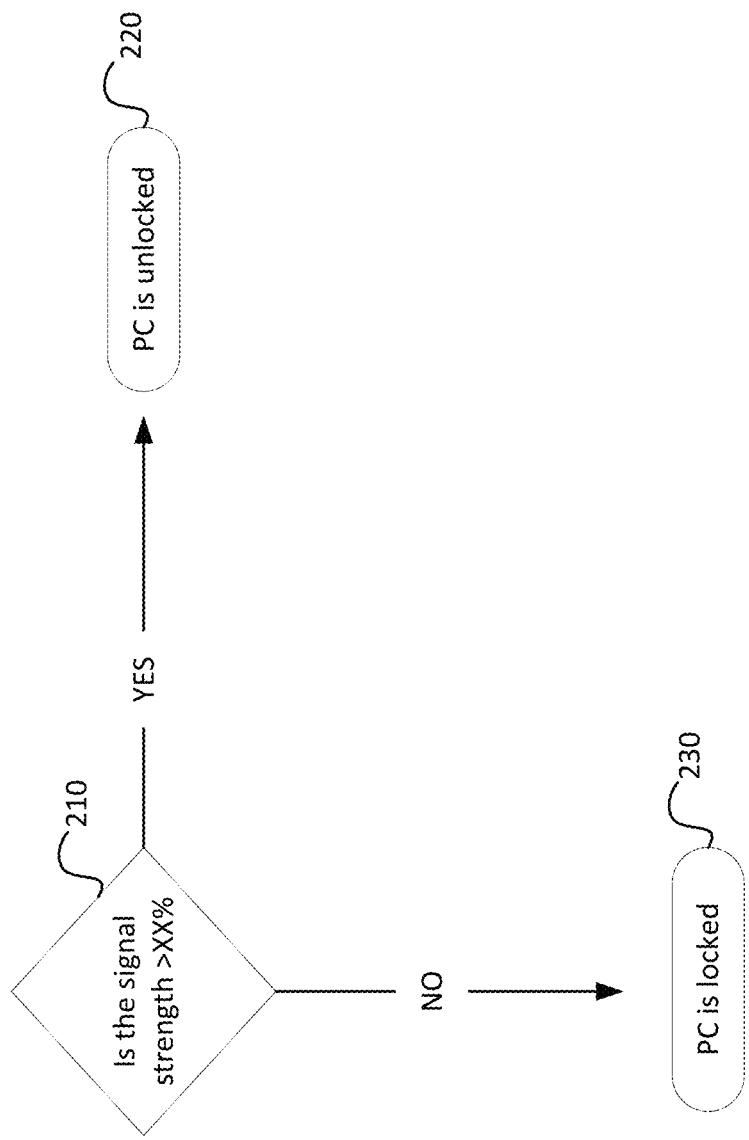
FIG. 3 illustrates a process through which a PC is electronically locked and unlocked during a wireless signal strength reading phase following a calibration phase.

FIG. 3 illustrates a process through which the PC 100 is electronically locked and unlocked during a wireless signal strength reading phase following the calibration phase. During this phase wireless signals, such as Wi-Fi signals, transmitted by the key device 10 are received at the PC 100 and a received signal strength (e.g., an RSSI) is determined. If the received signal strength is determined by the access control application 158 to be greater than a predefined level corresponding to the desired threshold separation between the key device 10 and PC 100 (stage 210), then the application 158 electronically unlocks the PC 100 (stage 220); otherwise, the application 158 electronically locks the PC (stage 230). In one embodiment, by default the application 148 uses the Windows lock/unlock function to electronically lock/unlock the PC 100. In other embodiments a custom screensaver and custom electronic lock/unlock function may be employed in lieu of the standard Windows lock/unlock. Such a custom electronic lock/unlock function could, for example, prevent access to all USB ports (except for the mouse port) when electronically locking the PC 100.

As may be appreciated by reference to FIG. 3, no user interaction with the device 10 or PC 100 need occur during the RSSI-signal-reading phase. Rather, the application 158 automatically periodically reads the Wi-Fi access point signal strength of the device 10 and electronically locks or unlocks the PC 100 when the device 10 is out of, or within, the predefined range established during the calibration process.

Figure 4A:
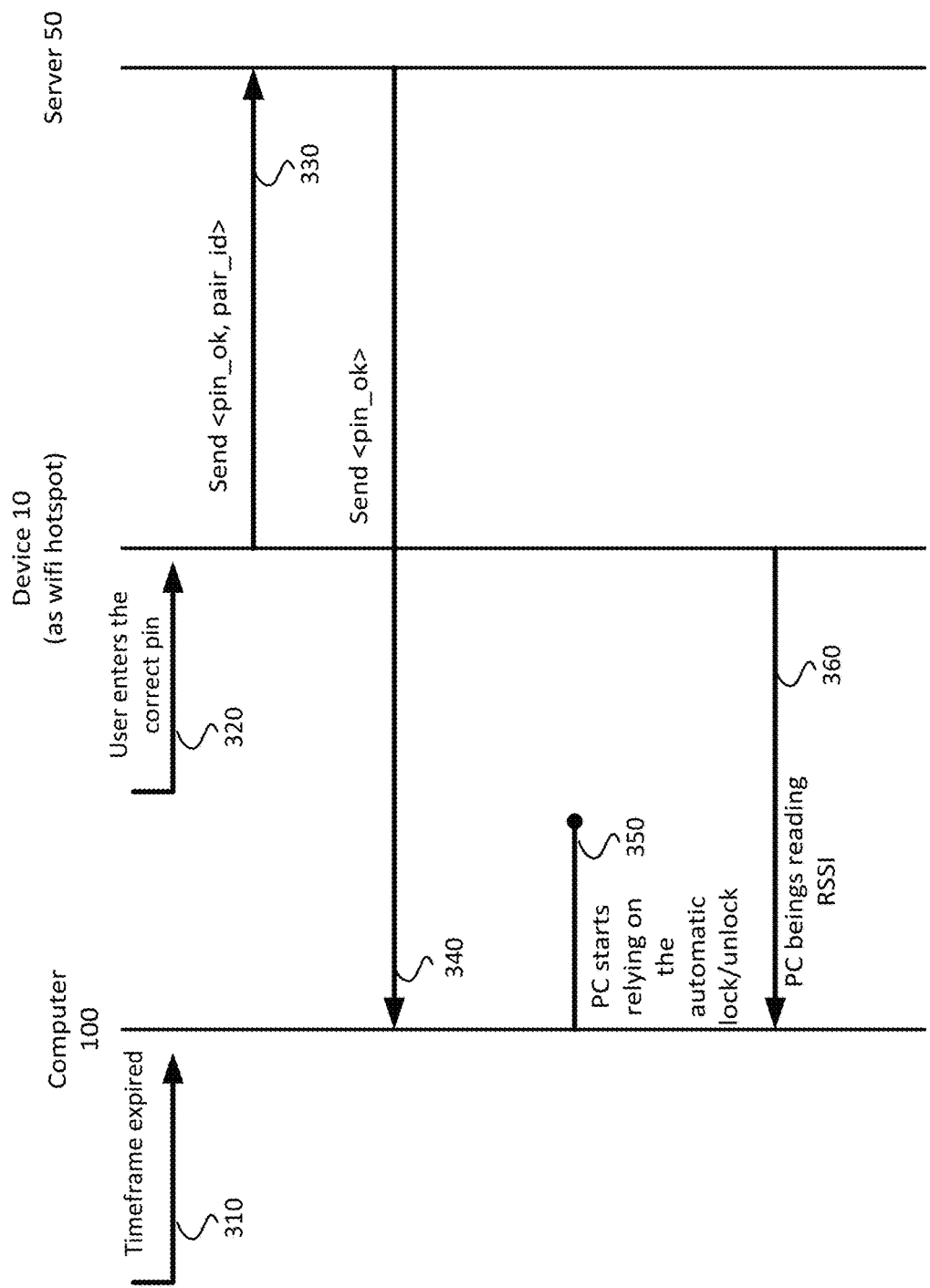
FIGS. 4A and 4B illustrate an optional re-authentication and lock/unlock option which may be utilized when, for example, an automatic electronic lock/unlock function (FIG. 3) has been disabled after an extended period of inactivity.
Figure 4B:
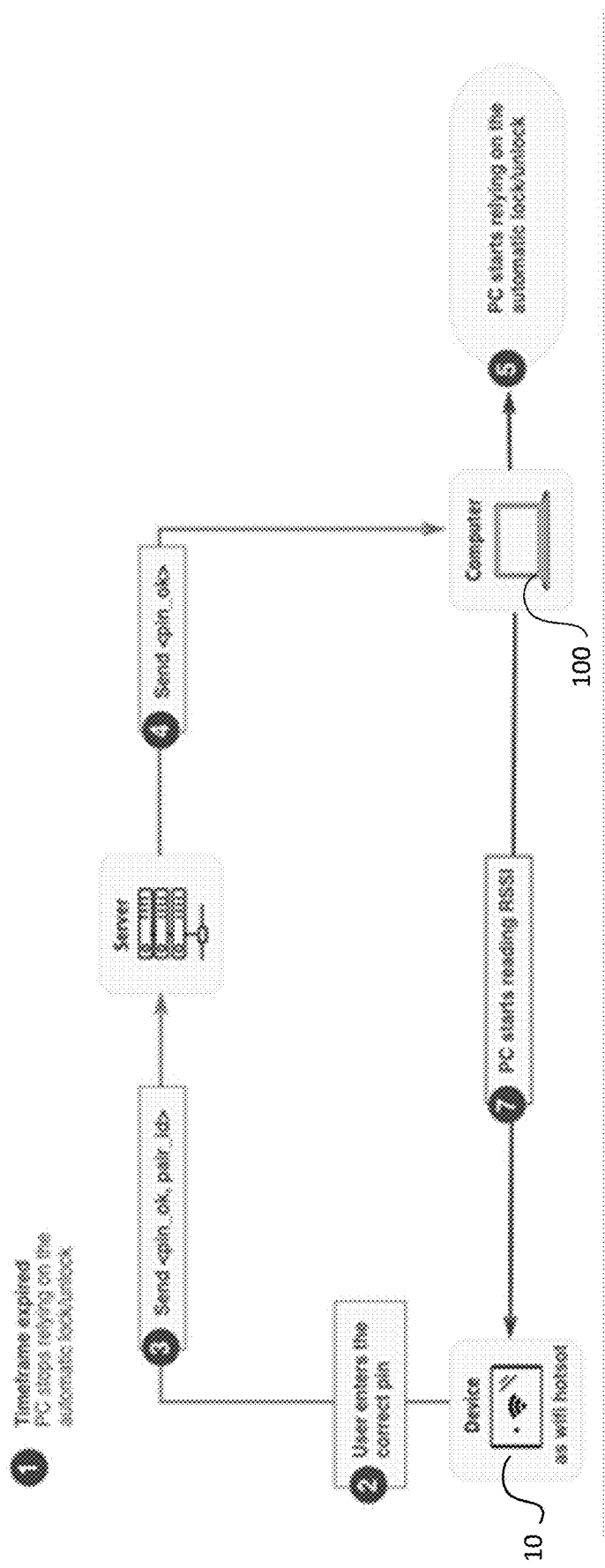

Referring to FIGS. 4A and 4B, there is illustrated an optional re-authentication and lock/unlock option which may be utilized when, for example, the automatic electronic lock/unlock function (FIG. 3) has been disabled after an extended period of inactivity. As shown, after the device 10 has been out of range of the PC 100 for longer than a predefined timeframe, the application 158 may disable use of the automatic electronic lock/unlock function (stage 310). To the extent the user again desires to rely upon the automatic electronic lock/unlock function to control access to the PC 100, the user enters his or her finger print or a PIN into a mobile application executing on the key device 10 (stage 320). As a result, the device 10 will make a push notification to the server 50, informing the server 50 that the automatic lock/unlock can be restarted (stage 330). The server 50 then forwards this message to the PC 100 (stage 340). From that moment on, the PC 100 will again rely on the proximity of the key device 10 to automatically lock/unlock (stage 350) and the application 158 again begins reading the RSSI of the Wi-Fi signals received from the device 10 (stage 360).

In one embodiment there is a fallback scenario for failure of automatic electronic locking/unlocking failure. As noted above, the automatic electronic unlock is achieved either through the conventional Windows unlock function or via a custom screensaver and de-blocking of previously-blocked USB ports of the PC 100. If the chosen one of these automatic unlocking modes fails, in one embodiment the application 158 is configured to implement manual Windows unlock as a fallback.

When the key device powers off or restarts, in one embodiment the mobile application executing on the key device 10 detects this power off or restart event and makes a push notification to the cloud-based server 50. This push notification informs the server 50 that the PC 100 should not rely on the automatic lock/unlock until further notice. This notification is forwarded to the PC 100 and the PC stops relying on the automatic lock/unlock. Later, when the key device 10 is again powered on, it pushes a DEVICE_ON notification to the server 50. This is then forwarded by the server 50 to the PC 100, which causes the application 158 to again utilize the automatic lock/unlock function in connection with control of access to the PC 100. In one implementation if the PC 100 becomes unable to detect the Wi-Fi hotspot produced by the key device 10, then the application 158 relies upon the manual Windows lock/unlock.

In one embodiment all communication between and among the device 10, server 50 and PC 100 is encrypted. In addition, when the device 10 or PC 100 has information to send to the server 50, the device 10 or PC 100 uses the unique pair ID generated during the handshake phase in order for the server 50 to be able to identify the pair correctly. This is a security enhancement, which prevents situations such as MAC or IP high-jacking.

As mentioned above, in an exemplary embodiment utilizing the Windows® operating system, the Native Wi-Fi API 148 comprises the API "Native Wifi". In this embodiment the following source code from the API was used to determine the RSSI signal strength:

```
// use a WlanClient from the API

WlanClient client=new WlanClint( );

// list all the available Wifi providers foreach (WlanClient.WlanInterface wlanIface in cli-
    ent.Interfaces)

{ wlanIface.Scan( );

Wlan.WlanBssEntry[ ]
    wlanBssEntries=wlanIface.GenetworkBssList( );

List<Wlan.WlanBssEntry>listWlanBssEntries=new
    List<Wlan.WlanBssEntry>( );

foreach (Wlan.WlanBssEntry network in wlanBssEn-
    tries)

{ listWlanBssEntries.Add(network);

// read the rssi of the current Wifi signal int rss=network.rssi;
```

Second System Configuration

Although the above-described first system configuration described above may provide appropriate and effective computer access control in a number of contexts, in certain cases it may be advantageous to employ the second system configuration described hereinafter. For example, in the first system configuration the setting of the key device 10 as a Wi-Fi hotspot increases battery usage. In addition, certain mobile devices (e.g., older or lower-end mobile phones) cannot simultaneously be both a Wi-Fi hotspot and wirelessly establish a wireless Internet connection. Although as a fallback option such devices could rely on a mobile data connection (e.g., an SMS connection) to send and receive the messages described with reference to the first system configuration, the second system configuration described below provides another alternative.

Figure 5A:
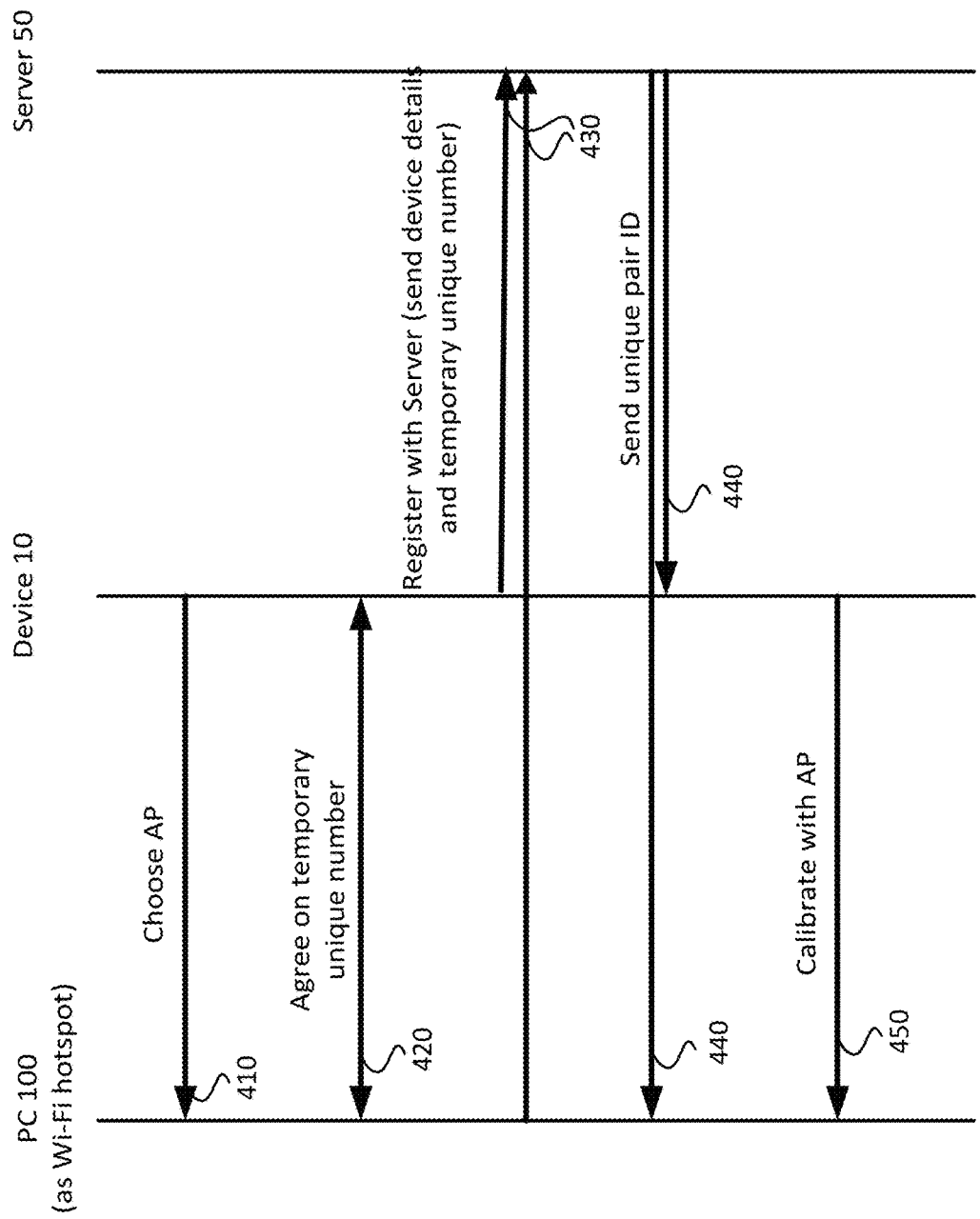
FIGS. 5A and 5B are flowcharts reflecting the manner in which a handshake phase is performed within a second system configuration.
Figure 5B:
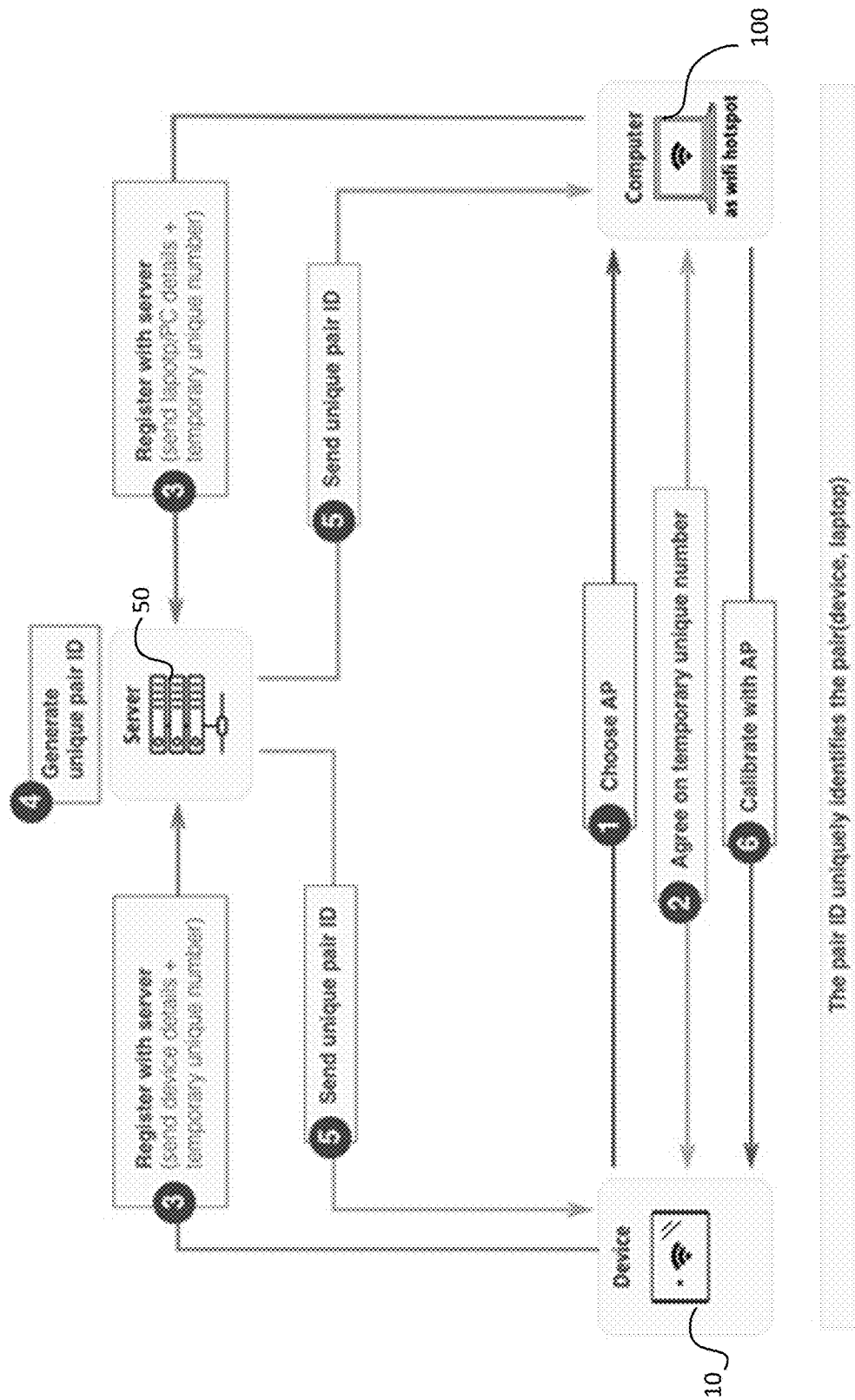

Attention is now directed to FIGS. 5A and 5B, which are flowcharts reflecting the manner in which a handshake phase is performed within the second system configuration. As shown, in one embodiment of the handshake phase the key device 10 detects all available Wi-Fi access points, one of which is selected by a user as the PC 100; that is, the user sets the PC 100 as a Wi-Fi hotspot. Once set as a hotspot, the PC 100 is detected and chosen by the key device 10 as the hotspot to which the device 10 will connect (stage 410). At this stage, both the key device 10 and the PC 100 register with server 50. In order to enhance security, as an initial step in this registration process the key device 10 and the PC 100 communicate through Wi-Fi direct and exchange a temporary unique-number (stage 420). Afterwards, both the key device 10 and the PC 100 send a device registration request to the server 50 (stage 430). In one embodiment each device registration request includes details specific to the device 10 or the device 100 and the temporary unique number. Because of the temporary unique number, the server 50 is able to detect which device registration-request is paired with which PC registration-request. The server 50 concludes this registration process by generating a unique pair ID and communicating this unique pair ID back to the key device 10 and the PC 100 (stage 440). As is discussed below, in one embodiment this unique pair ID will be later used in a re-authentication scenario.

Once the registration has ended, a user of the key device 10 and PC 100 may now configure locking/unlocking parameters relevant to the control of access to the PC 100. These parameters may include, for example, the Windows login credentials for the PC 100, the threshold distance between the PC 100 and the key device 10 at which locking and/or unlocking will occur, and the allowed timeframe during which multiple unlocks can occur without requiring re-authentication. Because the translation between wireless signal strength and meters is hardware dependent, the user of the key device 10 and PC 100 causes the access control application executing on the device 10 to perform a calibration operation with the PC 100 (stage 450). Through this calibration operation the access control application on the device 10 will learn which approximate signal strength translates into the desired threshold distance to the PC 100 and the device 10 stores this signal strength and potentially other information as calibration results.

Figure 6A:
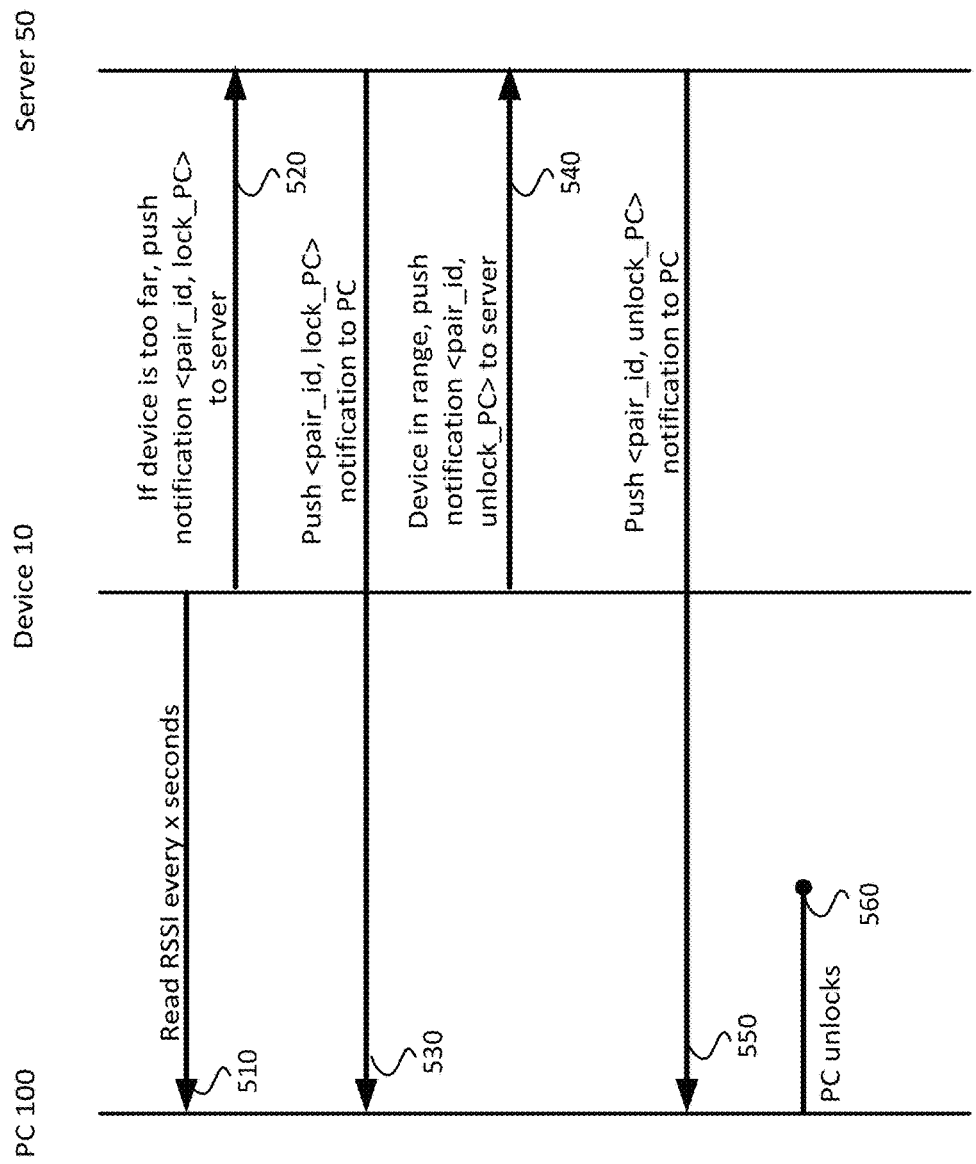
FIGS. 6A and 6B illustrate an alternate process through which a PC is electronically locked and unlocked during a wireless signal strength reading phase following a calibration phase.
Figure 6B:
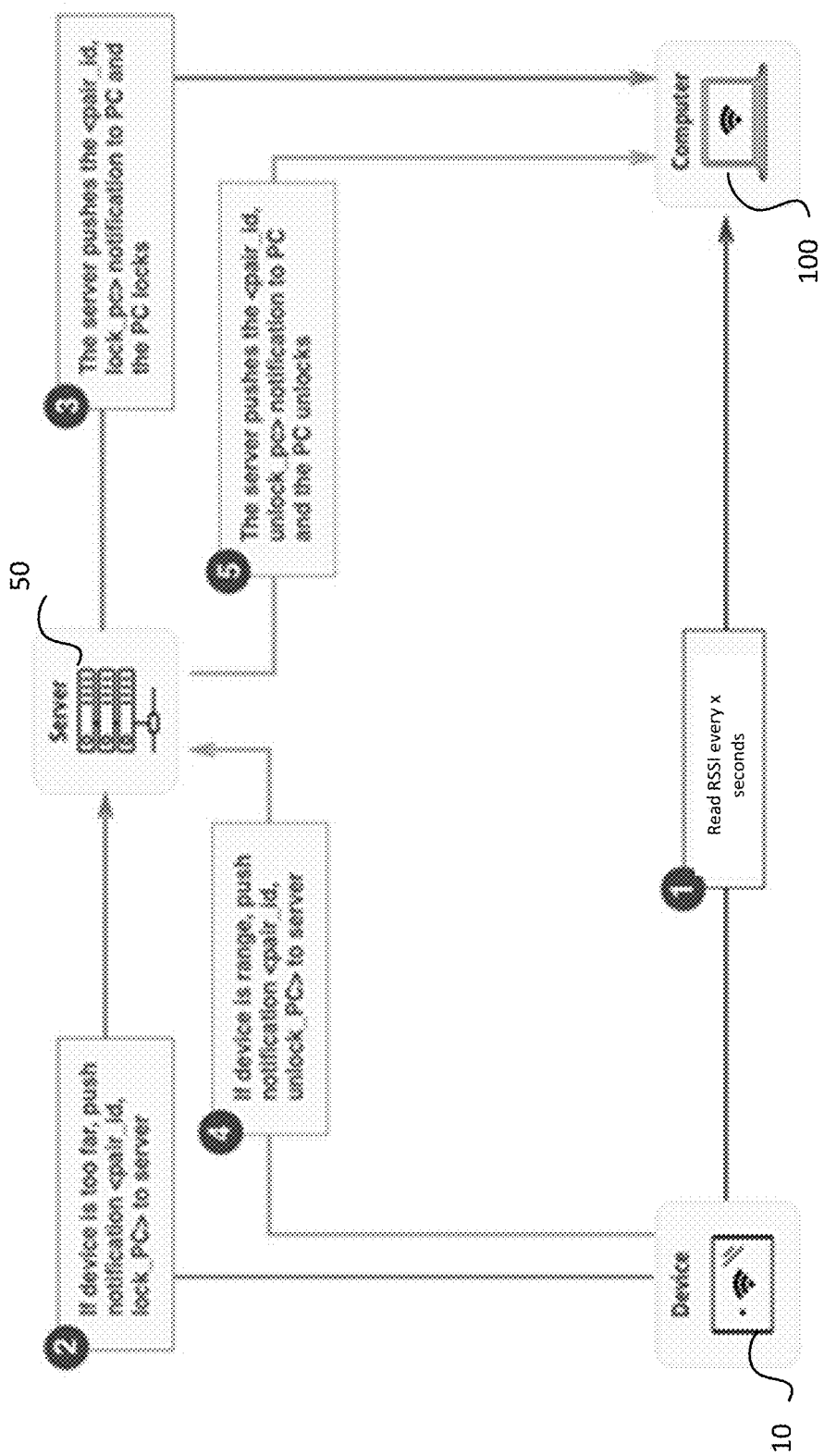

FIGS. 6A and 6B illustrate an alternate process through which the PC 100 is electronically locked and unlocked during a wireless signal strength reading phase following the calibration phase. During this phase wireless signals, such as Wi-Fi signals, transmitted by the PC 10 are received at the key device 10 and a received signal strength (e.g., an RSSI) is determined. If the received signal strength is determined by the access control application executing on the device to be less than a predefined level corresponding to the desired threshold separation between the key device 10 and PC 100 (stage 510), then the key device 10 pushes a notification to the server 50 indicating the device is out of range (stage 520). The server 50 then pushes this notification to the PC 100 (stage 530), which causes the application 158 to automatically electronically lock the PC 100. On the other hand, if the received signal strength is determined by the access control application executing on the device to be greater than a predefined level corresponding to the desired threshold separation between the key device 10 and PC 100, then the key device 10 pushes a notification to the server 50 indicating the device is in range of the PC 100 (stage 540). The server 50 then pushes this notification to the PC 100 (stage 550), which causes the application 158 to automatically electronically unlock the PC 100 (stage 560).

As may be appreciated by reference to FIGS. 6A and 6B, no user interaction with the device 10 or PC 100 need occur during the RSSI-signal-reading phase. Rather, the application executing on the key device 10 automatically periodically reads the Wi-Fi access point signal strength of the PC 100. In one embodiment, by default the Windows lock/unlock function is used to electronically lock/unlock the PC 100. In other embodiments a custom screensaver and custom electronic lock/unlock function may be employed in lieu of the standard Windows lock/unlock. Such a custom electronic lock/unlock function could, for example, prevent access to all USB ports (except for the mouse port) when electronically locking the PC 100.

Figure 7:
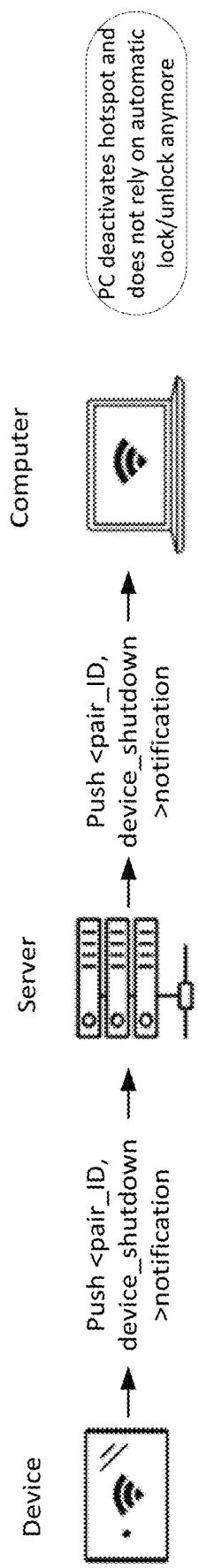
FIG. 7 illustrates a flow of events occurring in the event a key device shuts down during operation in accordance with the second system configuration.

Attention is now directed to FIG. 7, which illustrates a flow of events occurring in the event the key device 10 shuts down during operation in accordance with the second system configuration. As shown in FIG. 7, when the device key device 10 powers off/restarts, the device 10 sends a <pair_ID, Device_OFF> push notification to the server 50. Upon receipt of this notification, the server 50 forwards the notification to the PC 100. In response, the application 158 causes the PC 100 to stop relying on automatic electronic lock/unlock.

Figure 8A:
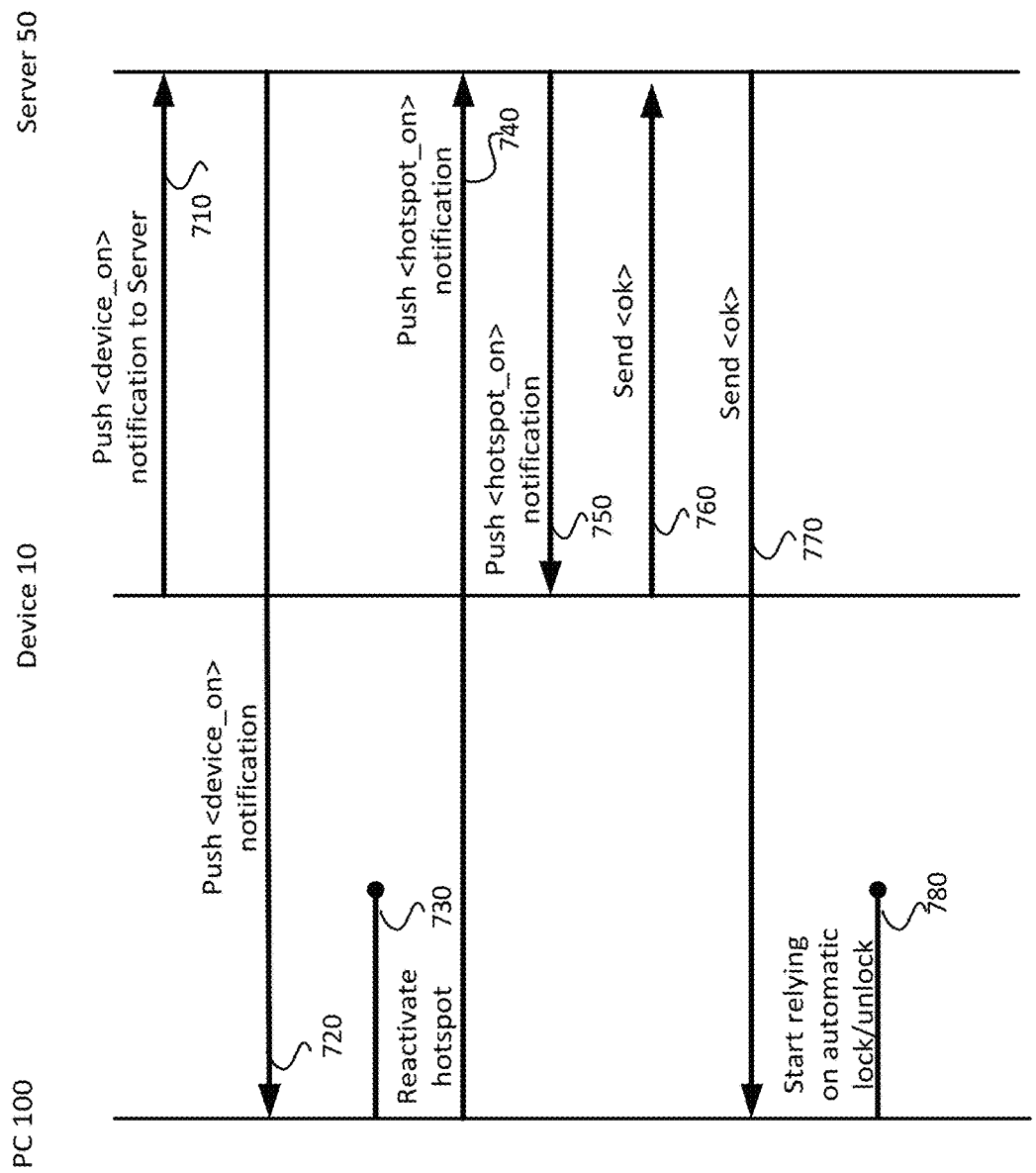
FIGS. 8A and 8B depict an exemplary flow of events occurring when the key device restarts after previously operating in the second system configuration.
Figure 8B:
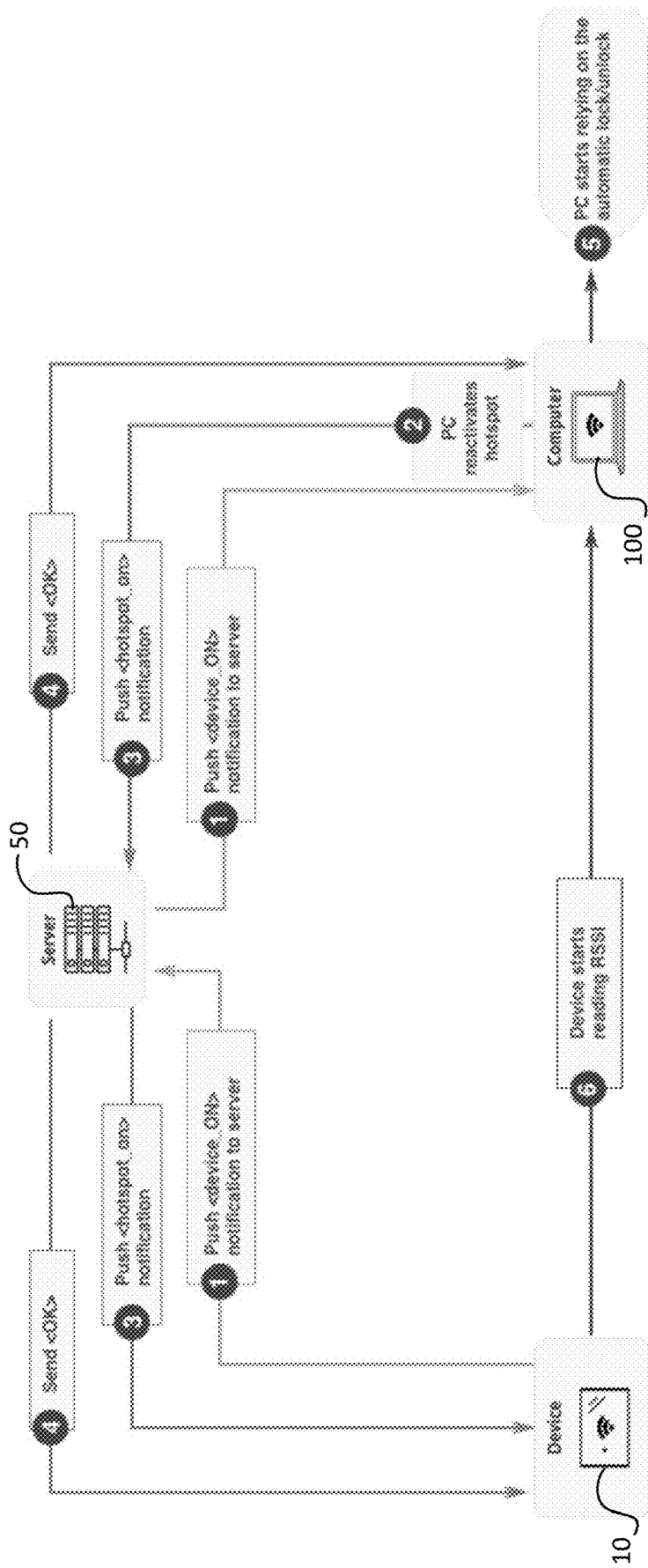

FIGS. 8A and 8B depict an exemplary flow of events occurring when the key device 10 restarts after previously operating in the second system configuration. As shown, when the key device 10 restarts it sends a <pair_ID, Device_ON> push notification to the server 50 (stage 710). The server 50 then forwards this notification to the PC 100 (stage 720). At that point the application 158 causes or otherwise ensures that the PC 100 is reactivated to operate as a hotspot (730). The application further causes the PC 100 to send a push notification back to the server 50 confirming that the PC 100 is activated as a hotspot (stage 740). The server 50 forwards this notification to the device 10 (stage 750) and the device 10 sends back an OK message to the PC 100 via the server 50 (stages 760 and 770). When the PC 100 receives the OK message, it restarts relying on the automatic lock/unlock (stage 780).

Figure 9:
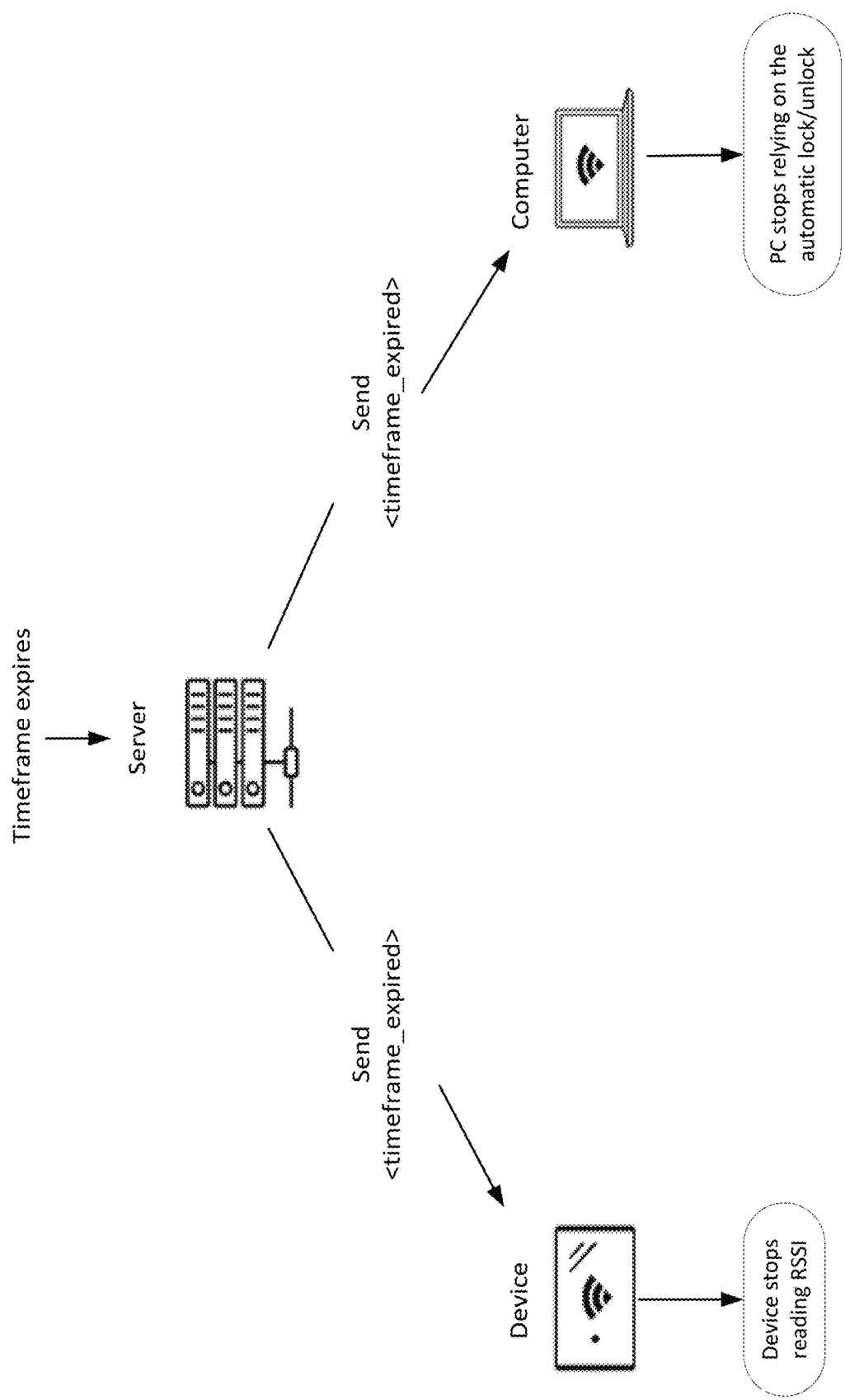
FIGS. 9, 10A and 10B illustrate a re-authentication process occurring in accordance with the second system configuration.

FIGS. 9 and 10 illustrate a re-authentication process occurring in accordance with the second system configuration. As indicated by FIG. 9, in one embodiment after a pre-defined period of inactivity is detected, the server 50 sends a <timeframe_expired> notification to both the device 50 and the PC 100. In response, the device 50 stops reading the RSSI of the wireless signals transmitted by the PC 100 and the PC 100 stops relying upon the automatic lock/unlock option (i.e., the PC 100 is not automatically locked/unlocked based upon the separation of the device 10 and the PC 100).

Figure 10A:
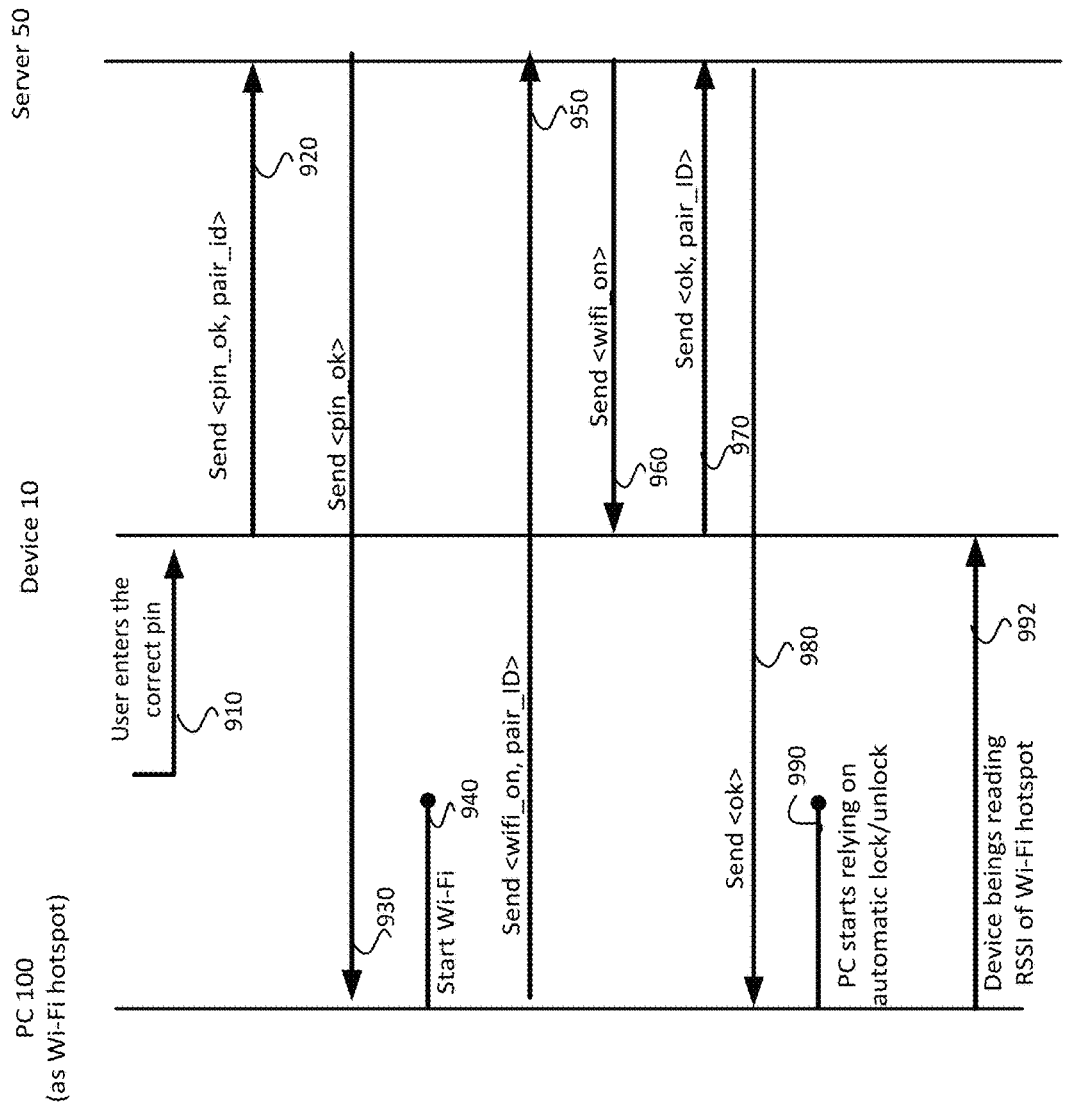
Figure 10B:
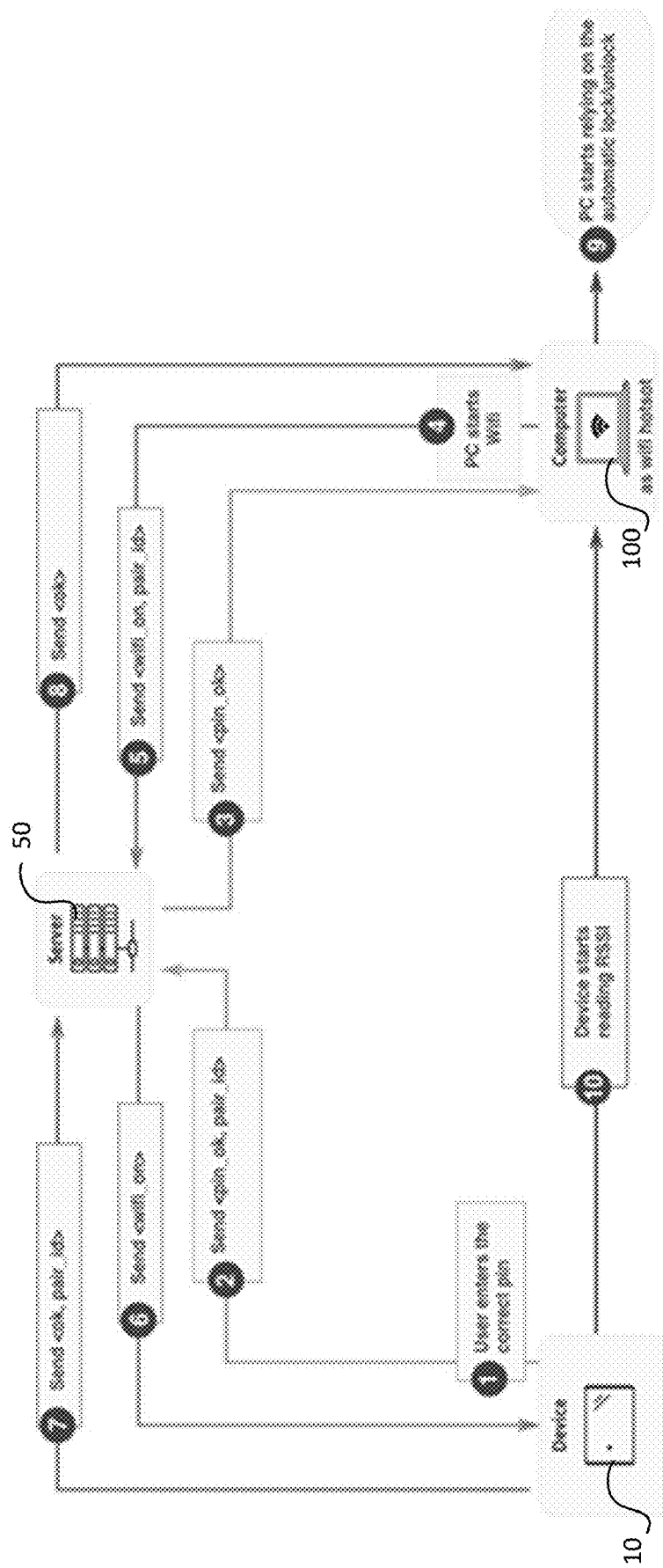

Turning now to FIGS. 10A and 10B, after the <timeframe_expired> notification has been received, the PC 100 waits until the application executing on the device 10 indicates that the user has entered the correct PIN, correct face recognition or a correct fingerprint has been detected (stage 910). In response, the mobile application further causes the device 10 to send an OK message to the server 50 indicating that a correct PIN or fingerprint has been received (stage 920). The server 50 forwards this OK message to the PC 100 (stage 930), which then activates its Wi-Fi hotspot functionality (stage 940) and notifies the server (stage 950). This notification is forwarded by the server 50 to the device 10 (stage 960), which in turn sends an OK message to the server 50 (stage 970) that is relayed to the PC 100 (stage 980). At this point the application 158 causes the PC 100 to start relying on the automatic lock/unlock function to electronically lock/unlock the PC 100 in accordance with the separation between the device 10 and PC 100 (stage 990) as determined by RSSI readings made by the device 10 (stage 992).

In one embodiment of the second system configuration, all communication between and among the device 10, server 50 and PC 100 is encrypted. In addition, when the device 10 or PC 100 has information to send to the server 50, the device 10 or PC 100 uses the unique pair ID generated during the handshake phase in order for the server 50 to be able to identify the pair correctly. This is a security enhancement, which prevents situations such as MAC or IP highjacking.

In one embodiment, if the PC is behind a NAT server (a common occurrence in commercial organizations), then the architecture of the second system configuration may be modified. As is known, NAT (Network Address Translation) is a method by which a public IP address is mapped to a specific private IP address. A NAT server is used to have a private LAN network with many private IP addresses behind a single public IP address (which is the address of the NAT server). One difficulty that may arise in this context is that, in a NAT network architecture, an outside actor cannot initiate a communication to a computer inside the private LAN unless the NAT is specially configured with port forwarding rules. That is, only PCs inside the private LAN behind the NAT can initiate conversations with the outside world.

Accordingly, because embodiments of the second system configuration disclosed herein rely on a computer (e.g., the PC 100) behind the NAT receiving push notifications from a cloud-based server (e.g., the server 50), at least two potential options exist:

(1) Either the NAT is with the appropriate port forwarding rule so that the server can initiate communication to the PC and push notifications to it; or (2) Server-PC communication is changes such that the PC 100 will be the one polling on the server 50 and, as a result, the one initiating the conversation with the server 50.

In one embodiment if both the device 10 and the PC 100 have problems connecting to the remote server 50, they fall back either to Wi-Fi direct communication or to the first system configuration discussed above. Alternatively, if just the device 10 loses access to the remote server 50, it may be configured to send a Wi-Fi direct message to the laptop, notifying it of the change and they fall back to the first architecture. If just the PC 100 stops having access to the remote server 50, then it stops relying on the automatic lock/unlock until the device 10 detects that the PC 100 has become unreachable by the server. At this point the device 10 initiates a Wi-Fi direct communication to the PC 100, at which time they either fall back to operation in the first system configuration or use Wi-Fi direct for communication.

In summary, embodiments of the disclosed computer access control system employ a novel process through which reading of the RSSI level of an emitted signal provides the basis for automatic locking and unlocking of computer. The disclosed embodiments advantageously provide the user with the possibility of selecting as a lock/unlock "key" any mobile device capable of acting as a Wi-Fi access point.

In addition, the disclosed system contemplates the following novel features, whether considered individually and/or in combination:

1. Windows-based computing device (e.g., PC, notebook, tablet, etc.) to lock/unlock.
2. Combination with a cloud server to generate the necessary registration and key pair generation for the unlock key device (e.g., smartphone).
3. The option to require additional re-authentication of the user on the key device before allowing the computer to unlock.
4. Calibration of the wireless signal allowing the signal strength to be translated into meters.
5. With respect to the first system configuration, measuring the mobile strength of a mobile device in Access Point mode.
6. With respect to the second system configuration, the ability to avoid putting the phone in Access Point mode and measuring the signal strength of the computer acting in Access Point mode to lock/unlock.
7. Fail safes for unlock in the case of Wi-Fi failure, failure to unlock, etc. as indicated in the description.
8. Ability to handle NAT situations without requiring port forwarding by having the locked device poll the server.

One particular feature of the disclosed system believed to distinguish it from prior approaches is the calibration operation permitting a predefined separation range to be set at which the computer will be automatically and electronically locked or unlocked. In contrast to other solutions predicated upon, for example, mere detection of a signal, the present system enables accurate identify that the user is no longer close enough to use the computer. For example, as discussed above Bluetooth-based solutions are likely to remain locked too long given the relatively long range (e.g., up to 10 meters) of Bluetooth signals. Also, if the phone is placed in a pocket or other location that blocks a Bluetooth signal, it will cause the computer to lock when the user is still in front of it. This would of course be extremely annoying if it happened frequently.

Protection of Folders

In addition to enabling the automatic locking/unlocking of a computer based upon the proximity of a mobile device, the teachings herein may also be utilized to selectively lock/unlock files or folders stored on the computer. That is, the mobile application executing on the key device and the access control application executing on the computer may be configured to allow the user to lock and unlock a safe/encrypted folder with the aid of the key device (e.g., a smartphone). In one embodiment even if the key device is near to the computer, the folder will be decrypted only if the user manually opens it to access his files. This folder lock/unlock feature may be implemented in a standalone form using essentially the same methods as the computer lock/unlock functionality described herein. Alternatively, the folder lock/unlock feature may be used in conjunction with the computer lock/unlock functionality described herein.

Briefly, then, an embodiment of the automatic locking/unlocking of folders in accordance with the disclosure may involve the following:

1. The user selects a particular mobile device as the locking/unlocking "key".
2. The mobile device will automatically cause unlocking of the folder when the mobile device comes in range of the computer (range is a threshold distance previously set by the user) and the user manually opens the folder stored on the computer.
3. The phone will automatically cause locking of the folder when the mobile device is out of range of the computer.

Both businesses and individual users can use this feature to ensure that their most important files are protected and secured. Once locked, the protected folder keeps personal or important files, such as documents, personal photos or videos, safe from, for example, ransomware attacks or other unauthorized access.

The protection of folders through the disclosed lock/unlock procedure can be implemented using either the first or second system configuration described above. For purposes of illustration the protection of folders using the second system configuration is discussed below; however, in view of the teachings herein it will be apparent to those skilled in the art that such folder protection could also be implemented using the first system configuration disclosed herein.

FIG. 10 illustrates a process through which one of more folders established within memory of the PC 100 are electronically locked and unlocked during a wireless signal strength reading phase. In one embodiment the wireless signal strength reading phase is preceded by handshaking, registration, calibration and configuration operations discussed below.

In one embodiment the handshaking, registration and calibration operations may be carried out between a key device and a PC 100 containing the folders to be protected in generally the same manner as was described above with reference to FIGS. 5A and 5B. That is, during a handshake phase the device detects all the available Wi-Fi access points and the user selects which one will be used as a key (so the PC 100 is set as a Wi-Fi hotspot). For enhanced security, at this phase, after the selection has been done, both the device 10 and the PC 100 will register with a cloud-based server 50, which generates a unique number for this pair and pushes it to both devices (this unique number will be later used in the re-authentication scenario and in all the push/poll notifications exchanged between the device 10, the server 50 and the PC 100). To properly complete this registration, in one embodiment both the device 10 and the PC 100 communicate through the push-notification server and exchange a temporary unique number. Next, both the device 10 and the PC 100 send their details and the temporary unique number to the server 50. The presence of the temporary unique number enables the server 50 to detect which device registration request is paired with which PC registration request. The server 50 then generates a unique pair ID and communicates this unique pair ID back to both the device 10 and the PC 100. Once the registration process is completed in this manner, the user may configure the locking/unlocking parameters applicable to protection of encrypted folders stored on the PC 100. In one embodiment these user-configurable locking/unlocking parameters include, for example, the lock method (discussed below) and the threshold distance.

Because the translation between wireless signal strength and the separation between the device 10 and the PC 100 is hardware dependent, the user calibrates the device application with the PC 100 in the manner discussed previously. In this way the device software will learn which approximate signal strength translates into the desired distance to the PC.

As part of the locking/unlocking configuration process, the user designates in advance which folders should be protected upon a locking condition. Any of several locking methods for securing the designated folder(s) desired to be protected may be employed:

(1) Encrypt the content within the designated folder.
(2) Hide the designated folder in kernel mode so that ransomware or other malicious code cannot find it.
(3) Upload the designated folder to a secure location in the cloud (this will give extra safety in case somebody manages to break the security and reaches the folder or in case something happens to the local storage). For performance reasons this could be a syncing process so that only changes to an existing copy in the cloud are uploaded.

Figure 11:
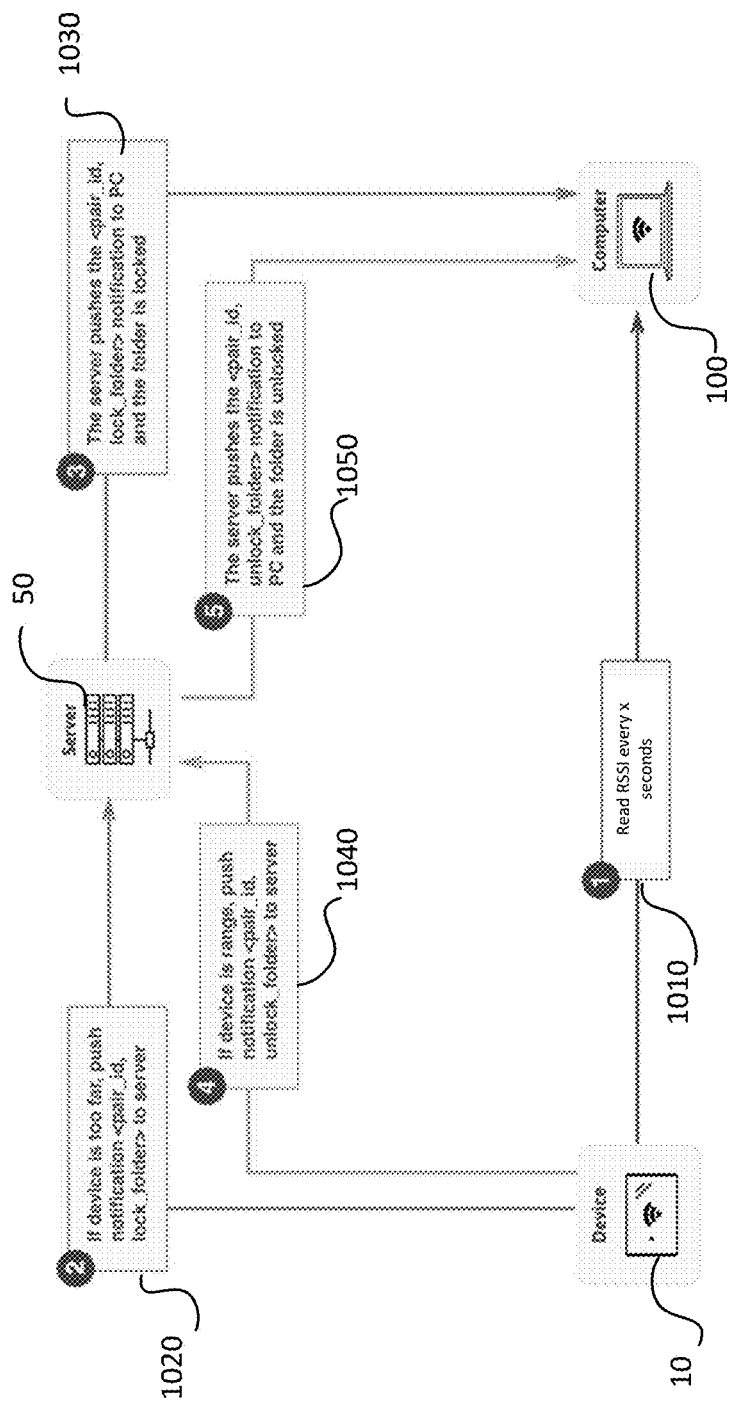
FIG. 11 illustrates a process through which one or more folders established within memory of a PC are electronically locked and unlocked during a wireless signal strength reading phase following a registration and calibration operation.

Attention is now directed to FIG. 11, which illustrates a process through which one or more folders established within memory of the PC 100 are electronically locked and unlocked during a wireless signal strength reading phase following the registration and calibration operation discussed above. During the signal strength reading phase, wireless signals transmitted by the PC 100 (e.g., Wi-Fi signals) are received at the key device 10 and a received signal strength (e.g., an RSSI) is determined (stage 1010). The threshold distance determined during the calibration phase is stored on the device 10 rather than the PC 100 (because in this implementation the device 10 performs the RSSI signal reading). If the received signal strength is determined by the access control application executing on the device to be less than a predefined level corresponding to the desired threshold separation between the key device 10 and PC 100 (stage 1010), then the key device 10 pushes a notification to the server 50 indicating the device is out of range and the designated folders are to be locked (stage 1020). The server 50 then pushes this "lock folder" notification to the PC 100 (stage 1030), which causes the application 158 to automatically electronically lock the designated folders of the PC 100 using the selected method. On the other hand, if the received signal strength is determined by the access control application executing on the device to be greater than a predefined level corresponding to the desired threshold separation between the key device 10 and PC 100, then the key device 10 pushes a notification to the server 50 indicating the device is in range of the PC 100 (stage 1040). The server 50 then pushes this "unlock folder" notification to the PC 100, which causes the application 158 to automatically electronically unlock the designated folders stored on the PC 100 (stage 1050).

As may be appreciated by reference to FIG. 11, no user interaction with the device 10 or PC 100 need occur during the RSSI-signal-reading phase. Rather, the application executing on the key device 10 automatically periodically reads the Wi-Fi access point signal strength of the PC 100.

In one embodiment all communication between and among the device 10, PC 100 and server 50 is encrypted. Moreover, when the device 10 or PC 100 has something to send to the server 50, it uses the unique pair ID generated during the handshake phase in order for the server to be able to identify the pair correctly. This is a security enhancement, which prevents situations such as MAC or IP high-jacking.

If the PC 100 sits behind, i.e., is accessed through, a Network Address Translation (NAT) server, then an alternative architecture may be employed. As is known, Network Address Translation is a method by which a public IP address is mapped to a specific private IP address. A NAT server may be used so that, for example, a private LAN network with many private IP addresses may exist behind a single public IP address (which is the address of the NAT server). One difficulty with this arrangement is that, in a NAT network architecture, an outside actor cannot initiate a communication to a PC inside the private LAN unless the NAT is specially configured with port forwarding rules. Only PCs inside the private LAN behind the NAT can initiate conversations with the outside world.

Accordingly, because in the second system configuration disclosed herein the PC is situated behind the NAT and needs to receive push notifications from the cloud-based server, there are two options for ensuring such push notifications are received. In a first approach the NAT is set with an appropriate port forwarding rule so that the server can initiate communication to the PC and push notifications to it. In a second approach the mode of server-PC communication is changed. Specifically, the PC is configured to poll on the server and, as a result, the PC initiates the conversation with the server.

If both the device and the PC have difficulties connecting to the remote server, both fall back to either communication through the push-notification server or to communication in accordance with the first system configuration. If only the device becomes unable to access the remote server, it sends a Wi-Fi direct message to the PC, through the push-notification server, notifying it of the change. At this point both the device and PC fall back to operating in accordance with the first system configuration. If only the PC becomes unable to access to the remote server, then it stops relying on the automatic lock/unlock until the device detects that the PC has become unreachable by the server. At this point the device initiates a communication to the PC, through the push-notification server, and both either fall back to operation in accordance with the first architecture or both use the push-notification server for communication.

Accelerometer-Based Movement Verification Option

In one embodiment, information provided by an accelerometer or other motion detection unit of the device can be used to confirm actual movement of the device and thus avoid erroneous locking or unlocking of the PC. In this way a "double check" may be performed before the application makes a decision whether to lock or unlock the PC.

One motivation for such a double check is the potential of WiFi signal fluctuations, which sometimes can generate a false "unlock" condition. For example, if the defined range for lock is very small (20 cm) and the phone or other device is positioned on a surface (e.g., a table) near the PC, the WiFi signal may fluctuate outside of the defined range even in the absence of movement of the device. Thus, particularly in cases in which the defined range is small, the PC lock/unlock application may incorrectly lock the PC even when the phone or other device has not moved.

In one embodiment, information provided by the accelerometer of the device is leveraged to determine whether or not the phone has changed position before locking or unlocking the PC. For example, by monitoring the output values produced by the accelerometer of the device, at the time of each WiFi signal strength reading the lock/unlock application may determine whether or not the device has moved since the previous signal WiFi signal strength reading. If, based upon the WiFi signal strength reading, the application determines that the PC should be locked and the accelerometer data indicates that the device has moved, then the application locks the PC. However, if instead the accelerometer data indicates that the device did not move, then the application does not lock the PC irrespective of the measured WiFi signal strength level.

To summarize, as part of the process of locking/unlocking the PC, in one embodiment the application determines, based upon the accelerometer data, if the position of the device has changed since the time at which the WiFi signal strength was last measured. Such monitoring of the accelerometer data to determine if the device has moved in order to confirm the validity of range determinations based upon WiFi signal strength is believed to be a unique and novel approach to avoiding erroneous locking and unlocking of the PC.

In some configurations, the apparatus or system includes means for performing various functions as described herein. In one aspect, the aforementioned means may be a module including a processor or processors and associated memory in which embodiments of the invention reside, such as are shown in the preceding drawings and which are configured to perform the functions recited by the aforementioned means. This may be, for example, modules or apparatus residing in client devices, host server systems, and/or other network devices such as are shown and/or described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

We claim:

1. A method for controlling access to a computing device, the method comprising:
    detecting, at a key device, one or more wireless devices configured as wireless access points;
    performing a handshake operation involving the key device and the computing device wherein the computing device is included among the one or more wireless devices;
    receiving, at the key device and during a calibration phase, wireless signals transmitted by the computing device wherein during the calibration phase the key device determines an approximate signal strength corresponding to a desired distance between the key device and the computing device;
    receiving, at the key device and subsequent to the calibration phase, other wireless signals transmitted by the computing device;
    detecting, based upon a received signal strength of the other wireless signals, that the key device and the computing device are separated by at least the desired distance and, based upon the detecting, electronically locking or otherwise inhibiting user access to the computing device;
    sending, based upon the detecting, a push notification to a remote server wherein the remote server forwards the push notification to the computing device and wherein the computing device is configured to initiate the electronically locking or otherwise inhibiting user access to the computing device based upon the push notification.

2. The method of claim 1 further including detecting that the computing device and the key device are separated by less than the desired distance and electronically unlocking or otherwise enabling user access to the computing device.

3. A method for controlling access to a computing device, the method comprising:
    detecting, at a key device, one or more wireless devices configured as wireless access points;
    sending, from the key device, a device registration request to a remote server wherein the device registration request forms at least part of a handshake operation involving the key device and the computing device wherein the computing device is included among the one or more wireless devices;

receiving, at the key device and during a calibration phase, wireless signals transmitted by the computing device wherein during the calibration phase the key device determines an approximate signal strength corresponding to a desired distance between the key device and the computing device;

receiving, at the key device and subsequent to the calibration phase, other wireless signals transmitted by the computing device;

detecting, based upon a received signal strength of the other wireless signals, that the key device and the computing device are separated by at least the desired distance and, based upon the detecting, electronically locking or otherwise inhibiting user access to the computing device;

sending, based upon the detecting, a push notification to a remote server wherein the remote server forwards the push notification to the computing device and wherein the computing device is configured to initiate the electronically locking or otherwise inhibiting user access to the computing device based upon the push notification.

4. The method of claim 3 further including detecting that the computing device and the key device are separated by less than the desired distance and electronically unlocking or otherwise enabling user access to the computing device.

5. A method for controlling access to a computing device, the method comprising:

detecting, at a key device, one or more wireless devices configured as wireless access points;

sending, from the key device, a device registration request to a remote server wherein the device registration request forms at least part of a handshake operation involving the key device and the computing device wherein the computing device is included among the one or more wireless devices;

receiving wireless signals transmitted by the computing device;

detecting, based upon a received signal strength of the wireless signals, that the computing device and the key device are separated by at least the desired distance and, based upon the detecting, electronically locking or otherwise inhibiting user access to the computing device;

sending, based upon the detecting, a push notification to a remote server wherein the remote server forwards the push notification to the computing device and wherein the computing device is configured to initiate the electronically locking or otherwise inhibiting user access to the computing device based upon the push notification.

6. The method of claim 5 further including detecting that the computing device and the key device are separated by less than the desired distance and electronically unlocking or otherwise enabling user access to the computing device.

\* \* \* \* \*